(12) United States Patent
Leban

(10) Patent No.: US 7,571,108 B1
(45) Date of Patent: Aug. 4, 2009

(54) SYSTEM AND METHOD FOR HANDLING ACTION ITEMS

(75) Inventor: Roy Leban, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1157 days.

(21) Appl. No.: 10/458,552

(22) Filed: Jun. 10, 2003

(51) Int. Cl.
G06F 9/46 (2006.01)
(52) U.S. Cl. .......................................... 705/8
(58) Field of Classification Search ............... 705/8
See application file for complete search history.

(56) References Cited

U.S. PATENT DOCUMENTS

| | | | | |
|---|---|---|---|---|
| 5,369,570 | A | * | 11/1994 | Parad .............................. 705/8 |
| 5,530,861 | A | * | 6/1996 | Diamant et al. ................. 705/8 |
| 2002/0087378 | A1 | * | 7/2002 | Como ............................. 705/8 |

OTHER PUBLICATIONS

R. Leban, Inventor's Notes, "A Structure-Oriented Task-Based Tool", 6-pgs., 1995.
R. Leban, Inventor's Notes, "Tools vs. Solutions", 5-pgs., no date.
R. Leban, Inventor's Notes, "More on Seybold", 11-pgs., no date.
R. Leban, Inventor's Notes, "Action List", 3 pgs., no date.
R. Leban, Inventor's Notes, "What Problem are We Solving?", 4-pgs., no date.
R. Leban, Inventor's Notes, "Picard.q&a document", 3-pgs., no date.
R. Leban, Inventor's Notes, "Picard.name.date", 6-pgs., no date.

* cited by examiner

*Primary Examiner*—Romain Jeanty
(74) *Attorney, Agent, or Firm*—Perkins Coie LLP

(57) ABSTRACT

A method and system for handling action items can determine the extent to which an action item can be processed using computer-based processing. Based on this determination, the present invention can complete the action item with a combination of automatic and manual processing. That is, the present invention can analyze an action item, initiate appropriate computer-based steps, and prompt human intervention to complete the action item. According to one exemplary aspect, the present invention can use a network connection to seek, identify, and utilize remote resources for processing an action item. According to another exemplary aspect, the present invention can derive action items from natural language, handwritten script entered into a tablet personal computer. According to another exemplary aspect, the present invention can process an action item list that includes both manual and automatic action items.

20 Claims, 13 Drawing Sheets

Table of Available Resources

| | |
|---|---|
| 510 Software Resources | 520 External Resources |
| Tax prep software: Y or N<br>Software resource 2: Y or N<br>.<br>.<br>Software resource $N_1$: Y or N | Mechanic Internet billing: Y or N<br>External resource 2: Y or N<br>.<br>.<br>External resource $N_4$: Y or N |
| 530 Hardware Resources | 540 Data Resources |
| WAN interface: Y or N<br>High-resolution printer: Y or N<br>.<br>.<br>Hardware resource $N_2$: Y or N | Yearly bank statements: Y or N<br>401K statements: Y or N<br>.<br>.<br>Data resource $N_5$: Y or N |
| 550 Connectivity Resources | 560 Miscellaneous Resources |
| Link to IRS: Y or N<br>Link to mechanic: Y or N<br>.<br>.<br>Connectivity resource $N_3$: Y or N | Surplus cash: Y or N<br>Misc. resource 2: Y or N<br>.<br>.<br>Misc. resource $N_6$: Y or N |

*Fig. 5*   ↙ 500

SYSTEM AND METHOD FOR HANDLING ACTION ITEMS

TECHNICAL FIELD

The present invention relates to assessing and automatically processing action items, and more specifically, it relates to computer-based handling of action items entered by electronic ink.

BACKGROUND OF THE INVENTION

A variety of approaches are conventionally taken for working with action items and other tasks. One of the most basic conventional approaches is a simple list of action items handwritten on a piece of paper and checked off as completed. Project management software is a contrasting example of a more sophisticated conventional approach that can facilitate the organization of projects entailing thousands of tasks and personnel. However, all of the conventional approaches have limitations related to their user interfaces and to their capabilities for intelligently assessing and automatically handling action items in an unconstrained environment.

Simple Lists

One of the simplest methods of recording and communicating a set of action items is listing them on a sheet of loose-leaf paper with a writing instrument such as a pen. Writing information by hand on a piece of paper is inexpensive and can be done quickly and easily with little preparation. The traditional method is also flexible in that a writer can generally write in any format anywhere on the paper. And, the completion of an action item can be indicated with a simple handwritten check mark. One of the limitations with handwritten work is that it is not easily manipulated or transferred to other contexts. In other words, modifying or transferring a piece of handwritten text typically requires rewriting the text on another medium.

Organizer Notebooks

Organizer notebooks provide a convenient alternative to loose-leaf paper for listing action items. An organizer notebook is a specially formatted notebook that aids in recording, organizing, and coordinating handwritten action items. To aid in scheduling action items, these notebooks typically incorporate a calendar. Although handy, bulk is one disadvantage for organizer notebooks. Like other traditional handwritten paper media, organizer notebooks do not easily provide for manipulating the information contained within.

Computerized Action Item Lists

As an alternative to using organizer notebooks, some people prefer to transfer handwritten action item lists from loose-leaf paper into personal computers. Specifically, with the widespread use of personal computers, textual information such as action item lists is readily recorded using word processing software running on a personal computer. The advantage of such electronic methods for recording information is that the information can be easily stored and transferred to other remote computing devices and electronic media. Such electronically recorded text can also be easily corrected, modified, and manipulated in a variety of ways.

Organizer Software

As an alternative approach to word processing software, conventional organizer software is available for personal computer systems to facilitate recording, organizing, and scheduling action items. Organizer software is analogous to an electronic version of the aforementioned, paper-based organizer notebook. Consequently, it facilitates manipulating action items following entry into a computer system. Organizer software is often included as a component of a larger software package, such as a project manager software package, a calendar software package, or an e-mail software package. Such software overcomes many of the limitations that are inherent both with recording action items on paper media and with converting action item lists into conventional electronic format via word processing software. However, conventional organizer software has substantial shortcomings related to its static nature and its lack of intelligent capabilities.

Being inherently static, conventional organizer software is limited in its capability to assess an action item to determine the potential for automatic completion and to automatically complete an action item. Consider the example of a user including 'send my wedding photograph to my niece' and 'get my teeth cleaned at the dentist' in an action item list. Conventional organizer software cannot differentiate between the potentially automatic nature of the former action item and the inherent manual nature of the latter. Conventional organizer software does not incorporate an intelligent feature to determine if the wedding photograph is available digitally and can be e-mailed directly to the niece, perhaps without human intervention. Thus, if the user wishes to consider automatically handling 'send my wedding photograph to my niece,' the user must manually determine: 1) the availability of a digital wedding photograph; 2) the location of the wedding photograph digital file, if it exists; and 3) the availability of sender and user e-mail resources.

Conventional organizer software has additional limitations related to assessing and processing action items. Conventional organizer software is limited in its capabilities to correlate an action item with resources required to complete the action item. Referring again to the wedding photograph example, conventional organizer software cannot automatically correlate the availability of the file, the location of the file, and the presence of e-mail capabilities to the action item. Furthermore, conventional organizer software is limited in its potential to dynamical track the availability of resources having potential utility for processing an action item.

In another area related to assessing action items, conventional organizer software also has limited capabilities to seek resources over a network for processing an action item. Continuing with the wedding photograph example, conventional organizer software cannot seek the digital file over a computer network, for example locating it on the hard drive of a second, networked computer.

After determining that sufficient resources are available, a user of conventional organizer software can manually complete an action item. To complete the wedding-photography action item, the user might go through the steps of: 1) closing the organizer software program; 2) opening an e-mail software program; 3) creating a new e-mail message; 4) pasting the digital photograph into the message; 5) pressing the 'send' button on the e-mail software's user interface to initiate a sequence of transmission steps culminating in transmitting the e-mail; 6) closing the e-mail program; 7) waiting; 8) receiving a reply that the photograph was successfully received by the niece; 9) opening the organizer software package; and 10) noting in the organizer software program that the task was successfully completed. The extent of manual steps in this example is representative of the limitations of conventional organizer software.

In addition to being inherently manual, conventional organizer systems have user-interface limitations. One of the limitations with the graphical user interface (GUI) systems of conventional software-based organizer systems is that a user must generally enter text by typing on a keyboard. For many people, entering text by keyboard typing is slower, more cumbersome, and less intuitive than handwriting. Although recent advances have been made in reducing the size of personal computers, they are still not as portable or accessible as traditional pen and paper. In contrast, traditional pen and paper provides the user with considerable flexibility for editing an action item and recording information in a personalized, intuitive format. Consequently, many people select conventional pen and paper over software-based organizer systems for maintaining action item lists.

To address the shortcomings of traditional keyboard and mouse interfaces, there have been various attempts to create an electronic tablet that can record handwriting for general computer utility. Such electronic tablets typically comprise a screen and a handheld stylus device that is similar to a pen. A user can manipulate the stylus to write on the electronic tablet in a manner similar to the use of traditional pen and paper. The electronic tablet can 'read' the strokes of the user's handwriting with the handheld device and render the handwriting in electronic form on the tablet's screen and/or the computer's display as 'electronic ink.' This electronic tablet approach can be employed in a variety of ways including on a personal computer and on a handheld computing device. One of the limitations of conventional software-based organizer systems is the lack of a user interface that is adapted to facilitate entering and manipulating action items with electronic ink.

Whether entered with electronic ink based on handwriting gestures or with conventional keyboard typing, many people are predisposed to written expression in the format of natural language. Conventional organizer software is also limited in its user-interface capabilities to enter action items via freeform, natural language text. Conventional organizer software does not offer a user the option to enter descriptive, natural language text and does not provide processing capabilities to derive an action item from text so entered. Returning to the action item example 'send my wedding photograph to my niece,' a user might express the intent of the action item with a range of descriptive text entries. For example, a user might enter 'send Rachel my wedding picture' or 'send my June 2000 wedding photograph to niece.' Conventional organizer software has limited capabilities to recognize the relationship between these textual descriptions of the same action item.

Code Schedulers

While organizer systems represent conventional software intended to facilitate user interaction with a list of action items, another type of conventional software is intended to facilitate the processing of computer code. Conventional computer systems often include code scheduling modules, such as chrons, batch scripts, or the equivalent, that schedule the computer's processing of instructions to optimize the computer's utilization of computing resources. For example, if a first instruction can utilize the result of a second instruction, this type of computing module can schedule the second instruction to be executed before the first instruction. One shortcoming of these conventional modules is their limitation in scheduling action items. Another shortcoming is their limitation in assessing and processing action items. Rather than action items, conventional code scheduling modules are optimized to process lines or blocks of code in a highly structured computing environment. Other limitations are related to those described above in reference to the limitations of conventional organizer software.

Project Management Software

Another type of conventional software deals with the utilization of project resources. Sometimes called project management software or project planning software, this type of software is a tool that assists a manager in following the completion of a project. Conventional project management software can also aid in planning and executing a project; for example helping a project manager to quickly evaluate alternatives for deploying project resources.

For example, the manager of a bridge construction project might use project management software to evaluate the positive schedule impact and negative cost impact of moving the construction workers from a 40-hour work week to a 60-hour work week. This could entail the manager manually inputting various resource scenarios and the software predicting the outcome. The manager might also use the software as an off-line tool to aid in his or her tracking of the stage of project completion. To utilize this capability, the manager would need to manually estimate the stage of completion of the projects tasks and milestones. Then, the manager would periodically need to make corresponding manual entries into the software. From these manual entries, the software might generate an overall view of the project status.

In summary, conventional project management software is off-line, manual, and requires meticulously detailed user input. Conventional project management software cannot assess a project task to determine the extent to which it can be completed automatically; and, it can not automatically process tasks. While action items concern activities in an unrestricted environment that is not well-defined, project tasks concern activities in the narrow context of a well-defined project that can be accurately represented in a software model. Furthermore, other limitations with conventional project management software are similar to those described above in reference to the limitations of conventional organizer software.

Process Control Software

Whereas conventional project management tools are intended to be used off-line, process control software is a type of conventional software that is frequently deployed in the on-line environment of a manufacturing process. This operating environment sometimes includes a distributed computing implementation of the software. On-line process control software can be used for such things as: controlling adding chemicals to a tank; starting a tank-agitation cycle; scheduling a batch sequence; and providing an indication of the completion of a chemical reaction so that an operator can empty a tank. Consequently, conventional process control software can provide real-time control in an operating environment that includes dynamic conditions. For example, conventional process control software can, in respond to an operator's instruction to 'make a batch of blue paint,' produce a product by controlling paint manufacturing machinery in real time. The control can respond to and correct for dynamic conditions. For example, the software might automatically add blue pigment ingredient to compensate for a off-color feedstock, thereby keeping the end product's color within product specifications.

While conventional process control software is responsive to changing conditions in its operating environment, the operating environment must be highly constrained. In fact, the process under control is frequently mathematically modeled to provide the precise definition that is required for proper software operation. For example, process control software suited to controlling the blue paint process that is described above would need to undergo significant customization to be useful in another, seemingly related, manufacturing process. Consequently, conventional process control software is limited in its utility for processing action items. Unlike process control instructions, action items concern activities in an unrestricted environment that is not well-defined. Additionally, conventional process control software cannot assess an instruction to determine the extent to which it can be completed with manual verses automatic control. Other limitations are similar to those described above in reference to the limitations of conventional organizer software.

Background Closing

In many instances, it would be desirable for a user to enter an action item into a computer and for a computer program to intelligently assess and process the action item. It would be desirable for a computer program to determine if the action item can be completed automatically, manually, or with a combination thereof. If an automatic processing was determined, the program could initiate automatically processing the action item. Alternatively, a computer could inform a user as to the potential for automatic processing so that the user can accordingly dictate the processing of the action item. If a combination was determined, it would be useful for the program to parse the processing of the action item into computer and manual steps.

In addition to the desirability of computer-based assessing and processing of action item, it would be desirable for a computer program to have capabilities related to tracking, identifying, and timing resources. It would be desirable for a computer program to track the availability of resources and to provide notification when adequate resources become available for automatically processing the action item. By timing the processing of an action item with the optimum availability of resources, the action item could be processed more efficiently than would be otherwise possible. It would also be useful for a computer to proactively seek resources over a network, such as a LAN or the Internet, for processing an action item. With appropriate resources identified, a computer could automatically complete an otherwise manual action item or offer a user several processing options.

Turning from functionality to user interface, in many instances it would be desirable for a user to interact with a list of action items entered into a computer system, such as a tablet personal computer, through a user interface optimized to facilitate handling action items. It would also be useful for an action item user interface to provide for entering action items with electronic ink and/or free form text.

Accordingly, there is a need in the art for a method and system for interacting with action items in an intuitive manner and for automatically and intelligently assessing and handling action items an inherently unstructured, unconstrained environment.

SUMMARY OF THE INVENTION

The present invention can include a method and system for handling action items. The system can include a computer system, such as a tablet personal computer and software, and a network connection to a LAN or to the Internet. Action items can include various tasks involving steps undertaken by one or more computers, one or more humans, or a combination thereof. Action items can also include steps undertaken by machines other than computers and the steps can be undertaken in conjunction with human and/or machine involvement. Steps can be undertaken with resources available locally and/or remotely over a computer network.

The present invention can include a method or system for assessing an action item to determine or predict the extent of human and automatic processing associated with its completion. The extent can be assessed in terms of a graduated level or one or more discrete levels. The discrete-level approach can include assigning a designation to an action item. As a non-limiting example, the designation can either correspond to or be chosen from the group of manual, semiautomatic, and automatic. The present invention can include a method or apparatus for processing an action item with a level of automatic processing or computer-based steps and manual processing or human intervention that is commensurate with the assessment. Action item processing can be initiated by a signal such as a prompt and can be based on parameters such as resource availability and user preference.

Multiple approaches are available to assess an action item to determine the extent of human and automatic handling. A first approach can include referencing an action item to a look up table. A second approach can include user assessment. A third approach can include comparing resources required to complete the action item with available resources. A fourth approach can include preliminarily processing an action item with automatic steps and then designating it as semiautomatic or manual if automatic processing becomes delayed. A fifth approach can include combining any of the above approaches.

According to one aspect of the invention, a computer can maintain a dynamically updated table of available resources with utility for processing action items. The table can include software resources, hardware resources, connectivity resources, external resources, data resources, and miscellaneous resources. The table can include local resources and resources available remotely via a network. The table can be updated periodically or by an event trigger such as system restart. Action item processing can be timed to coincide with the resource availability.

According to one aspect of the invention, an action item's resource requirements can be defined and recorded in a table. This table can be mapped to a table of available resources. An action item can be processed according to the map.

According to another aspect of the invention, text describing an action item can be entered by keystroke, electronic ink, or voice recognition. Deriving action items from the text can include natural-language processing or key-word extraction. Action items can also be selected from a defined list.

According to another aspect of the invention, a computer can prompt or otherwise signal a user for intervention or request status of completion of a manual step. Likewise, a user can initiate computer steps or receive status information from a computer regarding completion of an automatic step.

According to another aspect of the invention, screen displayed icons can represent action item parameters. An icon can indicate action item designation, for example manual, automatic, or semiautomatic. An icon can also indicate completion status of an action item, for example 'pending,' 'stopped,' 'complete,' 'manual step needed,' 'auto steps in progress,' or 'stalled.'

The discussion of handling action items presented in this summary is for illustrative purposes only. The present invention can handle action items with a combination of automatic processing and human intervention that is commensurate with application requirements, action item characteristics, user preference, and available resources.

BRIEF DESCRIPTION OF THE DRAWINGS

FIG. 5 illustrates a table of available resources having potential utility for processing action items according to one exemplary embodiment of the present invention.

DETAILED DESCRIPTION OF EXEMPLARY EMBODIMENTS

The present invention is suited for implementation in a computer system such as a tablet personal computer and can include a specially configured user interface with provisions for electronic-ink and natural language processing of free-form text. The present invention can provide a method and system for intelligently handling action items in a manner commensurate with application requirements, action item parameters, dynamic operating conditions, and user preferences. The present invention can assess action items based on parameters of an unconstrained operating environment to determine the extent to which action items can be completed automatically with computer-based processing steps, manually with human-intervention steps, or semi-automatically with both automatic and manual steps. The present invention can engage internal, local, remote, or networked resources to process the action item.

Exemplary Operating Environment

Figure 1:
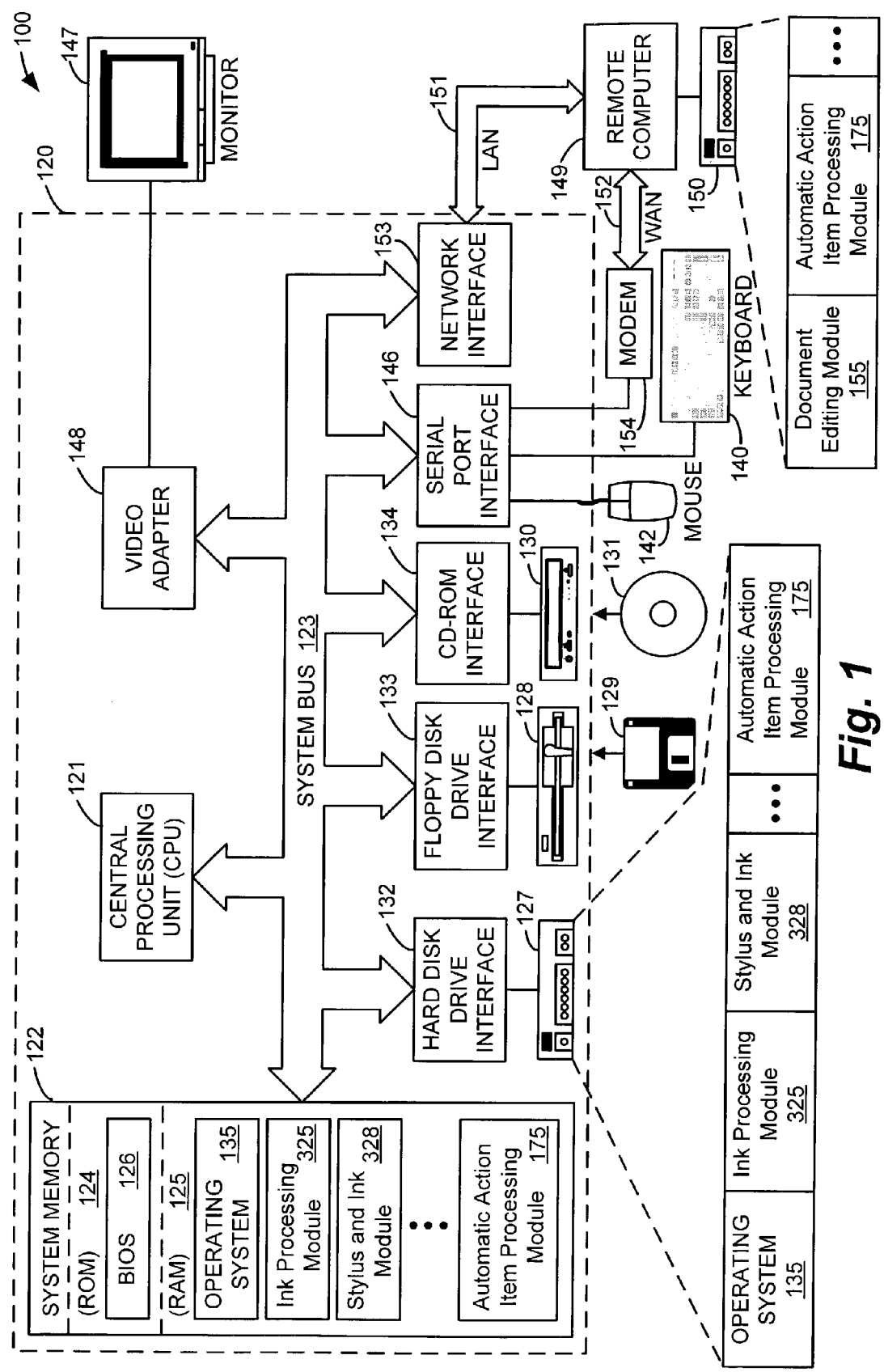
FIG. 1 is a block diagram illustrating an exemplary operating environment for implementing various embodiments of the present invention.

Exemplary embodiments of the present invention will hereinafter be described with reference to the drawings, in which like numerals represent like elements throughout the several figures. FIG. 1 illustrates an exemplary operating environment for implementation of the present invention.

The exemplary operating environment includes a general-purpose computing device in the form of a conventional personal computer 120, as exemplified by the architectural overview in the Figure. Generally, the personal computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within personal computer 120, such as during start-up, is stored in ROM 124.

Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively.

Although the exemplary environment described herein employs hard disk 127, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 120.

A number of program modules may be stored on hard disk 127, magnetic disk 129, optical disk 131, ROM 124, or RAM 125, including an operating system 135, an ink processing module 225, a stylus and ink module 228, a document editing module 175, and an automatic action item processing module 175. Program modules include routines, sub-routines, programs, objects, components, data structures, etc., which perform particular tasks or implement particular abstract data types. Aspects of the present invention may be implemented in the form of a ink processing module 225 that can operate in concert with a stylus and ink module 228 to edit an electronic document 220.

A user may enter commands and information into personal computer 120 through input devices, such as a keyboard 140 and a pointing device 142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 122 through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers 149. Remote computer 149 may be another personal computer, a server, a client, a router, a network personal computer, a peer device, or other common network node. While a remote computer 149 typically includes many or all of the elements described above relative to the personal computer 120, only a memory storage device 150 has been illustrated in the Figure. The logical connections depicted in the Figure include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other apparatus for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device 150. It will be appreciated that the network connections shown are exemplary and other provisions for establishing a communications link between the computers may be used.

In one exemplary embodiment of the present invention, a list of action items can be shared among multiple computer systems without a single computer being responsible for the entire list. The computer systems can be connected together in a networked or otherwise shared environment. In this embodiment, different computer systems and different people in different locations can implement different aspects of an action item list. For a single action item from the list, a computer in one location can implement one aspect of the action item and a person in a different location can implement another aspect of the action item. Moreover, a person and computer in one location can implement one action item from the list while another person and computer positioned together at a different location can implement another action item from the list.

Moreover, those skilled in the art will appreciate that the present invention may be implemented in other computer system configurations, including hand-held devices, multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2A:
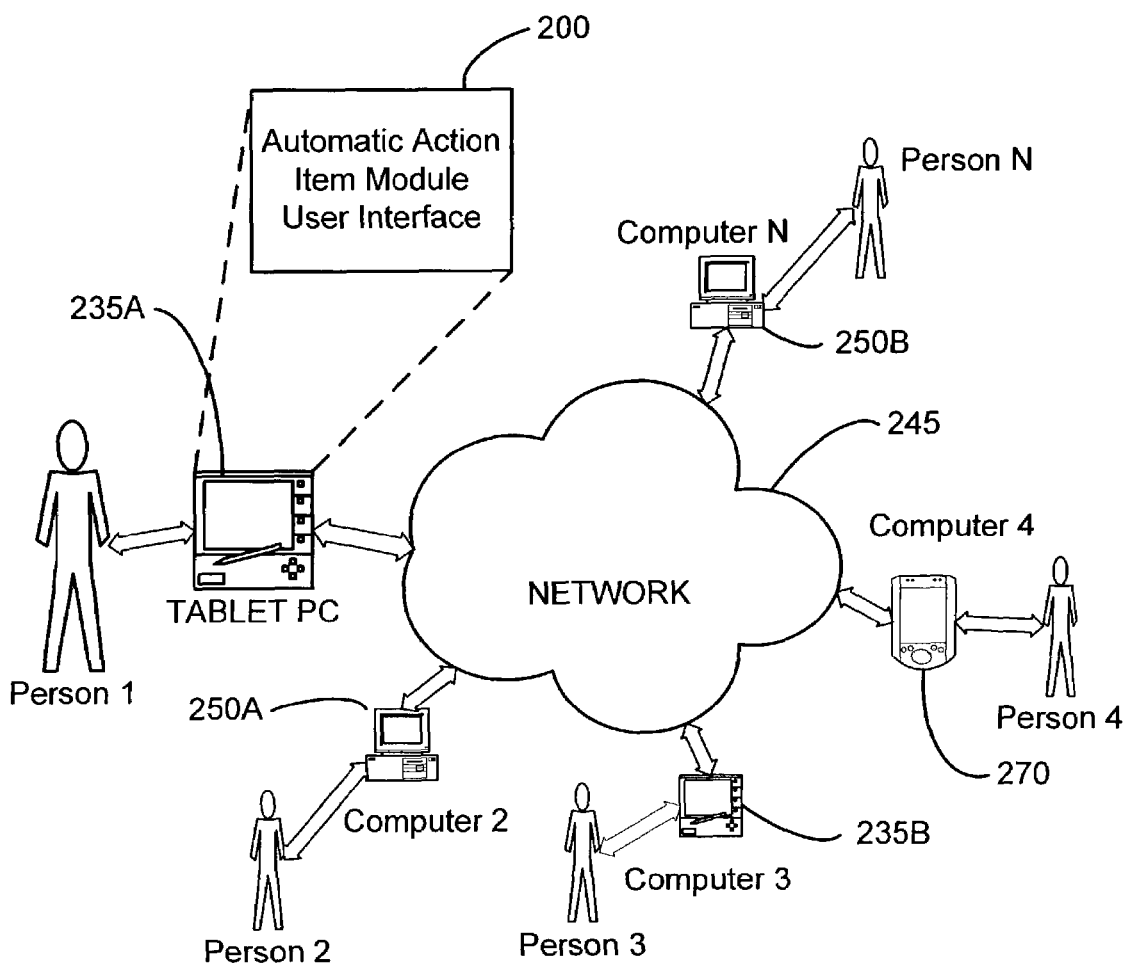
FIGS. 2A-2B depict an exemplary operating environment for implementing various embodiments of the present invention and illustrate some additional details of a user interface screen display according to one exemplary embodiment of the present invention.
Figure 2B:
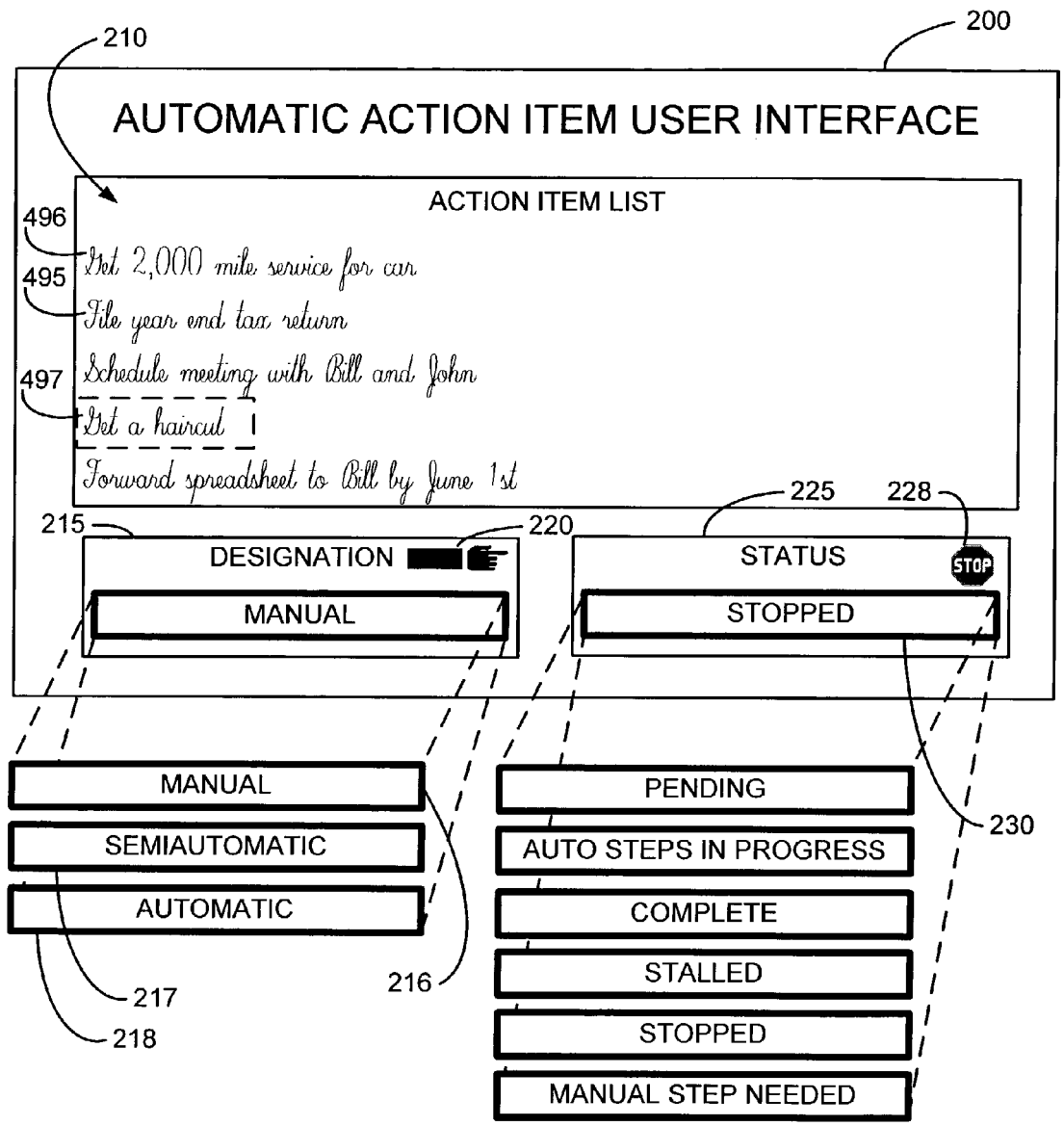

Referring now to FIGS. 2A-2B, an overview of an exemplary network operating environment for one embodiment of the present invention is illustrated. FIG. 2A shows N computer systems linked together via a network 245. The computer systems can include tablet personal computer systems 235, personal organizer computer systems 270, and conventional personal computer systems 250. Other devices, not shown, such as printers, fax machines, special purpose computers, and telephonic equipment can also be included in the network.

The network 245 can include a LAN, an intranet, an enterprise network, a service area network, the Internet, and/or another network. The network 245 can include various types of data links such as wireless data links, satellite data links, fiber optic data links, and electronic data links. The network 245 can be configured in a star, ring, or other topology. Using the network 245 to communicate with other devices, a computer 235A can seek resources for implementing the present invention from other computers and persons connected to the network 245. Alternatively, aspects of the present invention can be distributed among multiple computers and/or persons on the network 245.

One of the computer systems 235A can provide the primary user interface 200. Whereas FIG. 1 provides an example of storing the automatic action item processing module 175 in a conventional personal computer 120 that can have electronic ink processing capabilities, FIG. 2 provides an example of storing the module in a tablet personal computer 235 with electronic ink capabilities accessed via a user interface display screen 200. Electronic ink capabilities can include capabilities for editing electronic ink. A tablet personal computer 235 can signal other networked computers to implement various aspects of the present invention.

Referring now to FIG. 2B, the figure depicts an exemplary screen display of a user interface 200 of the primary user interface computer 235A. This screen display is related to a process 890 of FIG. 9 that is described below for assessing and processing action items. The screen display 200 includes a section 210 that lists action items such as 'get 2,000 mile service for car' 496, 'file year end tax return' 495, and 'get a haircut' 497. An entry can be selected, for example by highlighting the action item 'get a haircut' 497 as indicated in the Figure.

After selecting the action item 497, the user interface 200 can provide information to the user regarding the action item. Such information can be displayed in one or more sections of the display 200, for example in a 'designation' section 215 and a 'status' section 225. For example, if a selected action item is designated as manual by the assessment process 915, 920, described below in reference to FIG. 9, the screen indicator MANUAL 216 can appear on the exemplary display section 215 to inform a user of the manual designation. Likewise, if a selected action item is designated as semiautomatic or automatic, the screen indicator SEMIAUTOMATIC 217 or AUTOMATIC 218 can appear. The exemplary designation section 215 of the exemplary screen display 200 can also include a graphical icon 220 that indicates the designation of the action item. The screen display can also provide a user with the option, not depicted, to input a user-defined designation, for example to override a system-defined designation.

The exemplary user interface screen display 220 also provides an exemplary section 225 for tracking the completion progress of processing an action item. The completion progress can be represented by a text block 230 and/or by a graphical icon 228 that is updated during action item processing. After an action item is completed, the text block 230 or graphical icon 228 can also provide an indication of the processing used to complete the action item. For example, the graphical icon 228 can indicate that a completed action item was processed with manual, automatic, or semiautomatic processing. An exemplary process for updating status is described below.

Figure 3:
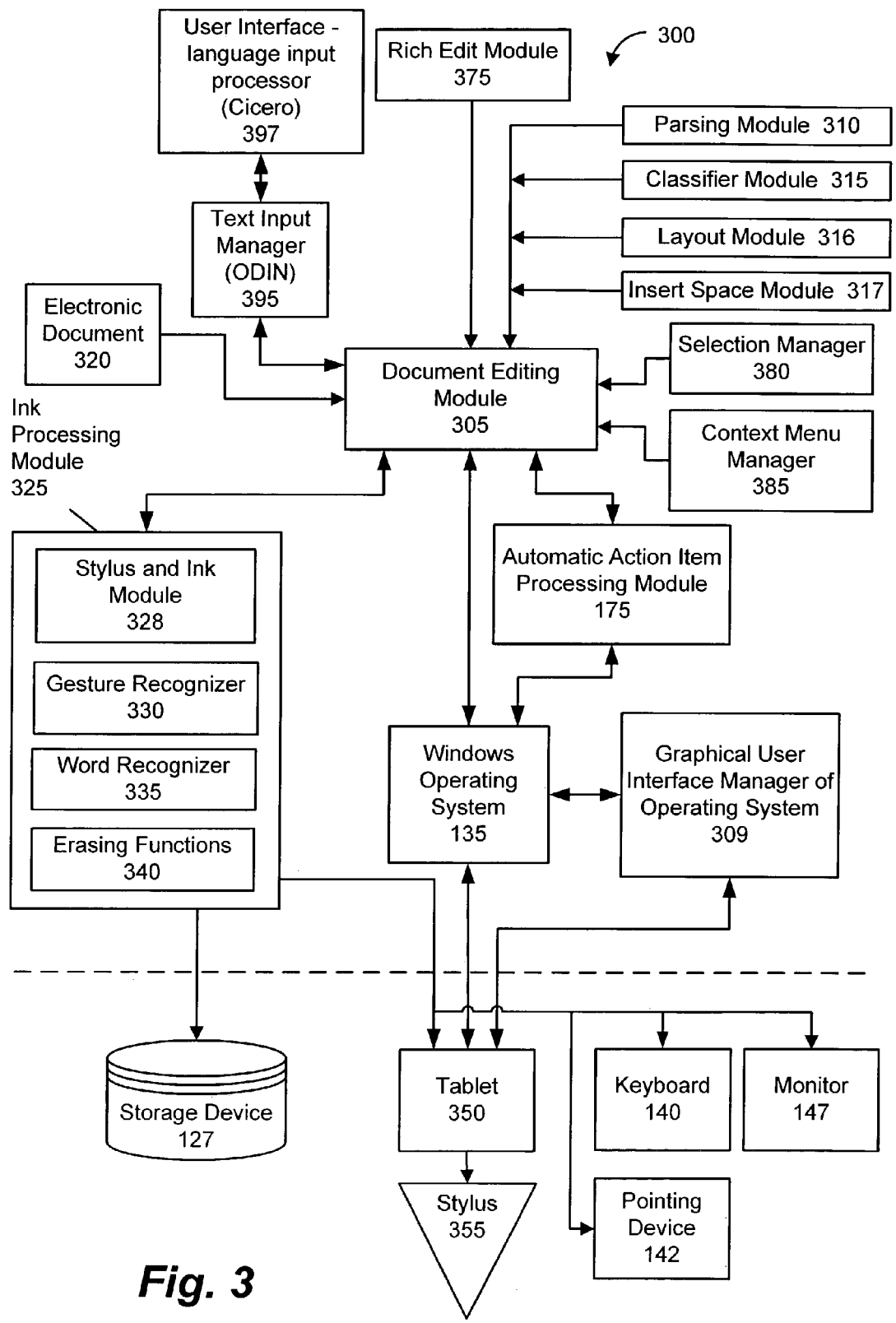
FIG. 3 is a block diagram depicting primary functional components of an exemplary free-form document editor and related input devices used to enter action items in one exemplary embodiment of the present invention.

Referring now to FIG. 3, an exemplary architecture 300 is illustrated for editing electronic ink in accordance with an embodiment of the present invention. FIG. 3 shows typical hardware and software components used in operating the invention from a functional perspective. Conventional input devices are represented by the keyboard 140 and the pointing device (mouse) 142. A user can enter commands and information into the computer 120, depicted back in FIG. 1, using the input devices. Other input devices (not shown) may include a microphone, joystick, game pad, satellite dish, and scanner.

A conventional output device, such as monitor 147, is used to display information from the computer 120. Other output devices (not shown) can include a printer or speaker. Other hardware components shown in FIG. 3 include an electronic tablet 350 and an accompanying stylus 355. The tablet 350 and stylus 355 are used to input handwriting strokes which are converted to collections of data that can be represented as electronic ink. The electronic ink may be incorporated into an electronic document 320 and may be displayed on either the electronic tablet 350 or the monitor 370, or both.

Although the electronic tablet 350 and the monitor 370 are illustrated as being distinct, in a preferred and exemplary embodiment they are either coupled or form a single component. The joint tablet/monitor component has the ability to display information and receive input from the stylus 355. Also shown among the hardware components is a conventional electronic storage device such as a hard drive 127 or RAM 125.

In the representative architecture 300, the hardware components are coupled to an ink processing software module 325. It should be understood by those skilled in the art that FIG. 3 is merely representative and that in practice the hardware components typically are coupled to the elements shown in FIG. 1. The ink processing module 325 is operable for receiving data from the electronic tablet 350 and/or the stylus 355 and rendering that data as electronic ink. In a preferred and exemplary embodiment, the ink processing module 325 is a collection of software modules that perform different tasks for rendering handwriting strokes as electronic ink.

For example, the stylus and ink module 328 can receive data describing the positions and angles of the stylus 355 for a series of handwriting strokes. The stylus and ink module 328 can interpret the data for rendering electronic ink. Other software modules, such as a gesture recognizer 330 and word recognizer 335 can be designed to identify certain handwriting strokes and assign them a particular significance. For example, certain gestures such as a cross-out may be recognized and associated with other editing processes. The ink processing module 325 can also include an erasing functions module 340 for removing electronic ink that has been previously rendered.

The windows operating system 135 can comprise a graphical user interface (GUI) manager 309. The GUI manager 309 in combination with the document editing module 155 can link to the automatic action item user interface screen display 200 depicted in FIG. 2 so as to provide the display with capabilities for editing electronic ink.

The document editing module 155 can be operatively linked to the automatic action item processing module 175. The document editing module can use application programming interfaces (APIs), not shown, to form this link. With the APIs, the document editing module 155 can make calls to other application programs associated with implementing the present invention.

The document editing module 155 may further comprise a collection of software modules for controlling and manipulating electronic ink rendered on the monitor 370. For example, a parsing module 310 can be used to identify handwriting strokes that are selected by the user for editing. Selected strokes may by highlighted or shaded to assist the user in identifying which strokes are to be edited. A classifier module 315 can identify certain handwriting strokes as being part of a word or drawing. Software modules such as the layout module 316 and the insert space module 317 can be designed to control how electronic ink is rendered and moved. Other modules can include a selection manager 380, a context menu manager 385, a text input manager 395, and a user interface language input processor 397.

The selection manager 380 can monitor how converted text or electronic ink is selected for editing by the user. The context menu manager 385 can monitor the selection of a list of alternate words that can be displayed when a user edits a word in converted text. The text input manager 395 can operate as an interface for a user interface language input processor 397 that uses language rules to assist in the recognition of words through context.

Ink processing modules are known in the art and are useful for an electronic tablet to function. The modules shown in FIG. 3 are representative and those skilled in the art should understand that other modules may also be part of or coupled to the document editing module 155. For example, the document editing module 155 may work with a rich edit module 375 that provides added functionality such as monitoring and controlling the selection of text and word wrapping.

The present invention includes multiple computer programs which embody the functions described herein and illustrated in the exemplary display screens and the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the exemplary display screens and flow charts and associated description in the application text, for example.

Therefore, disclosure of a particular set of program code instructions is not considered necessary for an adequate understanding of how to make and use the invention. The inventive functionality of the claimed computer program will be explained in more detail in the following description in conjunction with the remaining Figures illustrating the functions and program flow.

Certain steps in the processes described below must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

Exemplary Subsystem for Entering Action Items

Figure 4A:
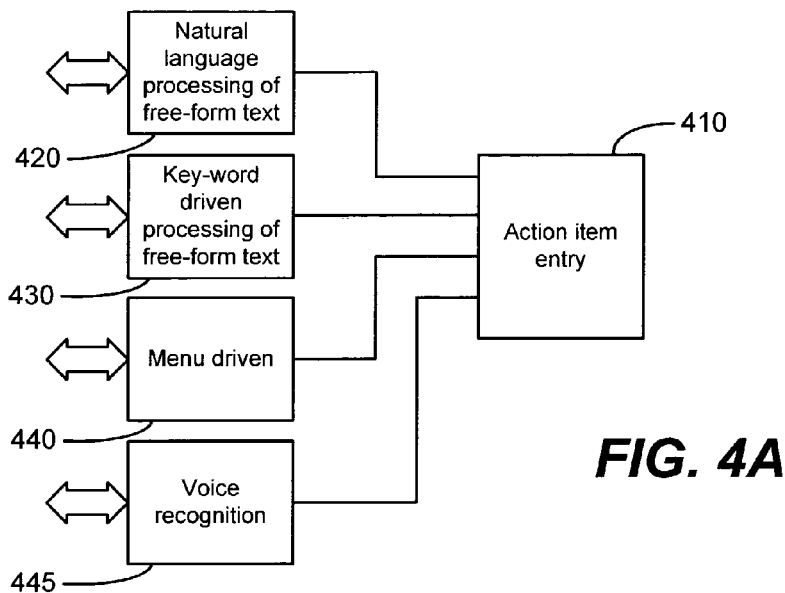
FIGS. 4A-4B depict a block diagram for entering action items and a related exemplary user interface display according to one exemplary embodiment of the present invention
Figure 4B:
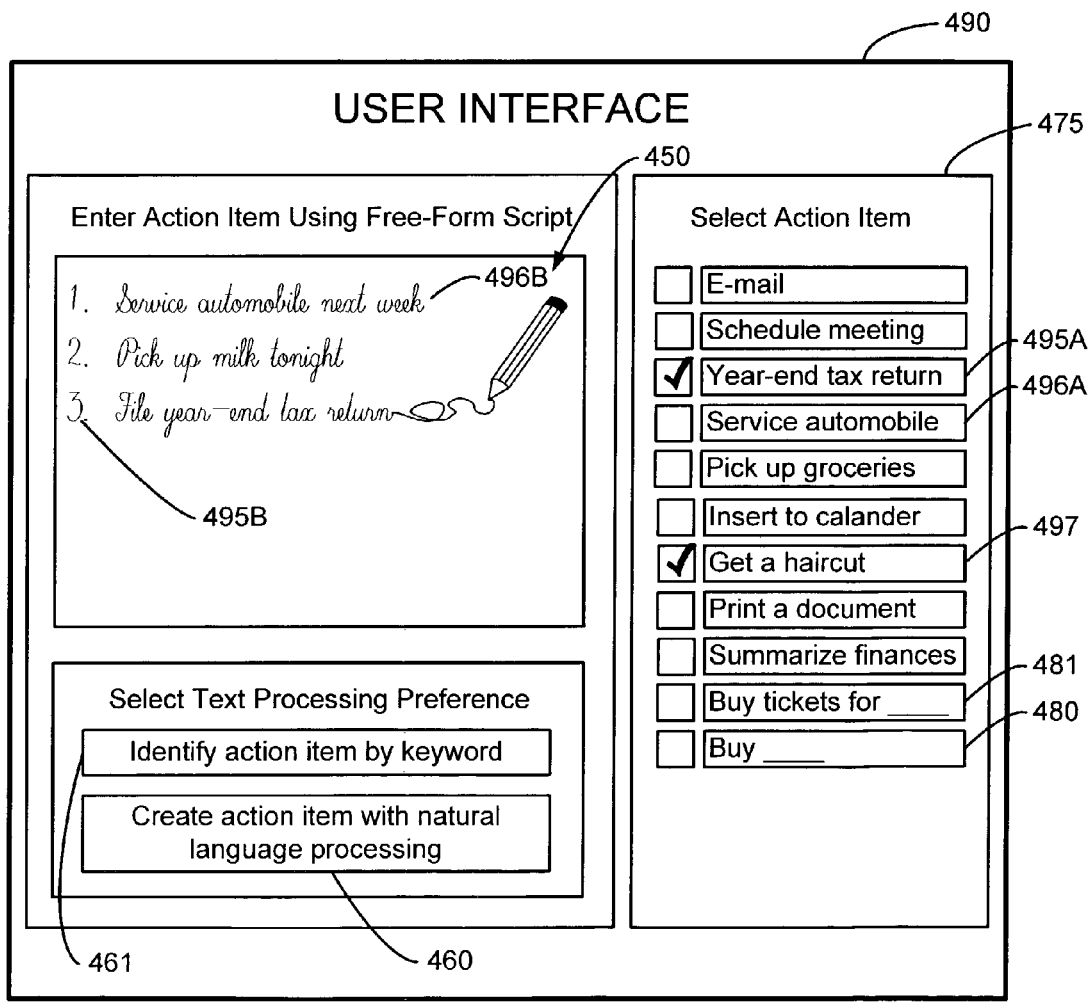

The present invention can include a user interface subsystem. Referring now to FIGS. 4A-4B, these figures illustrate some exemplary aspects of a user interface subsystem related to entering action items. FIG. 4A depicts a functional block diagram overview of exemplary functional components for entering action items. FIG. 4B illustrates an exemplary screen display 490 of a user interface that provides for user interaction including entering action items.

Referring now to FIG. 4A, this figure illustrates exemplary processing options to generate action item entry 410 from various forms of user input. The Figure depicts an exemplary relationship between components, each of which may include software routines, not depicted. A component 420 that provides natural language processing of free-form text is operative to derive an action item from text that is input by electronic ink or conventionally typed text, the input of which is described below in reference to FIG. 4B. A component 430 that provides key-word processing of free-form text can also derive an action item from input text. A component 440 that provides menu driven input can select an action item from a list of action items as described below in reference to FIG. 4B. A component 445 that provides voice recognition can derive an action item from spoken language that is input as described below in reference to FIG. 4B. These processing options are described in more detail below in reference to FIG. 4B.

Referring now to FIG. 4B, the screen display 490 can include a window 475 that provides user access to a set or menu of defined action items. The screen display 490 can be responsive to electronic ink and can be a component in a tablet personal computer system 235, such as those illustrated in FIG. 2A. An action item of the set can be selected by checking a box on the screen display using an electronic ink stylus 355, such as the one illustrated in FIG. 3. For example, the action items 'year-end tax return' 495A and 'get a haircut' 497 can be selected as indicated in the Figure. In the example display 490, other listed action items, such as 'service automobile' 496A, remain unselected.

The set can be defined generically so that when a user acquires a system that embodies the present invention, the user has access to a predefined set of action items. The user can customize the predefined set, for example appending the set. Action items in the defined set can also be assessed to determine a subset that can be processed with available resources. This subset can be displayed in a user interface similar to 490.

To facilitate menu-driven processing 440 of action items, the defined set can be structured into a hierarchical format or divided into nested subsets having related characteristics. For example, a first subset can be made up of action items related to purchasing consumer goods. Within the first subset, a second subset can be made up of action items related to purchasing tickets. Within the second subset, a third subset can be made up of action items related to purchasing concert tickets.

When coupled to a hierarchical interface, the hierarchical set format can facilitate user access to a list of action items. For example, selecting the action item 'Buy _' 480 can provide user interface to a first subset. Selecting the action item 'Buy tickets for _' 481 can provide user interface to a second subset. 'Buy tickets for the season opening football game' is an example of an action item that can be included in the second set. 'Buy tickets for the fall concert series' is an example of an action item that can be included in the third subset Menu-driven processing 440 can also be engaged through a tree-structure user interface, not illustrated. A tree-structure interface can access a database of action items that is not necessarily hierarchically structured. In addition to entering action items, menu-driven user interfaces can be used for general user interface with action item handling. For example, a menu-driven interface can be used to initiate processing steps to complete an action item.

The exemplary screen display 490 can also support entering action items by electronic-ink-based handwritten script 450. For example the action items 'service automobile next week' 496B and 'file year-end tax return' 495B can have equivalent meaning to the corresponding menu-driven entries 496A, 495A.

Handwritten script 450 can explicitly spell out an action item. In other words, handwritten script can recite, word-for-word, an action item. Handwritten script 450 can also be processed to identify an action item without a word-for-word recitation. For example, handwritten script gestures 450 can be processed with an ink processing module 325, as depicted in FIG. 3 and elsewhere, to convert the gestures into conventional, free-form word and sentence content based on ASCII text.

Although not illustrated in the FIG. 4B, the screen display can also provide for keyboard-typed entry of free-form text. Free-form text, whether derived from electronic ink or from convention keyboard typing, can be processed with natural language processing 420 or key-word driven processing 430, as illustrated in FIG. 4A, to generate an action item. Such processing can either select an action item from a defined list to facilitate or provide for the generation of a user-defined action item. The screen display 490 can include entry points, illustrated as buttons 460, 461 in FIG. 4B, for a user to select a preference for processing free-form text as illustrated in FIG. 4A. In addition to entering action items, natural language processing of free-form text can be used for general user interface with action item handling. For example, natural language processing can be used to initiate processing steps to complete an action item, not illustrated.

Referring now back to FIG. 4A, action items entered via spoken language do not necessarily require a visual user interface screen display 490. Spoken text can be processed by voice recognition processing 445. The voice recognition processing can generate free-form text that can be processed as described above, for example fed, not illustrated, into the natural language processing component 420. A voice-driven user interface can be based on a tree structure and can include an interactive voice response system. In addition to entering action items, spoken language can be used for general user interface with action item handling. For example, a spoken command can initiate processing steps to complete an action item.

Exemplary Components for Tracking Resource Availability

Referring now to FIG. 5, this figure illustrates an exemplary component of the present invention for tracking resources that have potential utility for processing action items. By tracking resource availability, the present invention can process action items according to the availability of resources. In a preferred and exemplary embodiment, resources are identified and tabulated 500 along with an indication of availability 501, 502. The exemplary table 500, titled Table of Available Resources in the Figure, can be a component of the Automatic Action Item Processing Module 175 and can be stored electronically in RAM, or in on a machine-readable medium such as a magnetic disk, hard drive or optical disk.

While the Figure depicts resources tabulated into a conventional table 500, those skilled in the computer arts will recognize that a wide range of information file structures can be used to track resource availability without departing from the intent of the present invention. The exemplary table 500 is segmented into categories; however, categorization is not required.

The illustrated table 500 offers resource examples. Software resources 510 can be software programs that are potentially useful for processing action items. For example, a tax preparation software package 511 could be useful to process the action item 'file year end tax return' 495 that is checked in FIG. 4B. The software's availability could dictate whether the return is filed manually or by computer.

As another example, a check registry software program, not illustrated, could be useful for processing an action item such as 'balance my checking account for November,' not illustrated. The availability of a check registry software program could dictate whether the action item is processed automatically or manually. If it is determined that the software is available, the present invention can initiate the software program to balance the checking account on December 1. If it is determined that the software is not available, the present invention can prompt a user to manually balance the checking account. In another scenario, the present invention can determine that, although the check registry software package is not currently available, availability is scheduled for the near future. Based on this determination, the present invention can delay processing to coincide with resource availability so that the action item can be processed automatically rather than manually.

Referring briefly back to FIG. 2A, in yet another scenario the present invention can seek the check registry software over a network 245 such as a LAN or the Internet. In an exemplary scenario, the action item might have been entered into a tablet personal computer 235 that did not have the check registry software. When the tablet personal computer 235 is connected to a network 245, the present invention can seek the software, for example locating and accessing it off of a conventional personal computer 250. The tablet personal computer 235 can signal the conventional computer 250 to implement automatic processing steps needed by the action item. Alternatively, responsibility for processing the action item can be transferred to the conventional computer 250 which can complete the action item utilizing locally accessible resources. In this manner, the present invention can process a list of action items without a single computer being responsible for the entire list. The tablet personal computer 245 can be linked to the network 245 via a hard-wire connection or via a wireless connection.

Referring back to FIG. 5, the table 500 also includes a hardware resources category 530. This category can include resources such as a WAN interface 531 that can be useful for processing action items involving remote resources and a high-resolution printer 532. The printer resource 532 can be useful for processing action items related to presentations, graphics, and digital photographs.

The table 500 also includes a connectivity resources category 550. The resource 'link to the IRS' 551 could be useful for processing the action item 'file year-end tax return' 495 as illustrated in FIG. 4B. The resource 'link to mechanic' 552 could be useful for processing action items related to servicing automobiles.

The table 500 also includes an external resources category 520. This category exemplifies remote resources. For the example of automatically processing the action item 'file year-end tax return' 495 of FIG. 4B, IRS capabilities to process an electronically submitted tax return is a useful resource in addition to 'tax preparation software' 511 and 'link to IRS' 551. Similarly, the resource 'mechanic Internet billing' capability 521 can be useful for processing action items related to servicing an automobile.

The table 500 also includes a data resources category 540. The resources 'yearly bank statements' 541 and '401K statements' 542 can be useful for processing action items related to filing taxes and generating personal financial summaries.

The table 500 also includes a miscellaneous resources category 560. The resource 'surplus cash' 561 could be useful for processing action items related to purchasing personal goods that are out-of-budget expenditures.

It should be understood that the foregoing examples are only illustrative and that the present invention provides for numerous variations and can accommodate a wide range of resources beyond those listed above without departing from the spirit and scope of the invention.

Exemplary Process for Tracking Resource Availability

In one embodiment of the present invention, the availability of resources is dynamically tracked so that action items can be processed according to changes in resource availability. To facilitate this, the Table of Available Resources 500 can be updated, either by adding or subtracting resources from the table or by setting an availability indication flag 501, 502.

Figure 6:
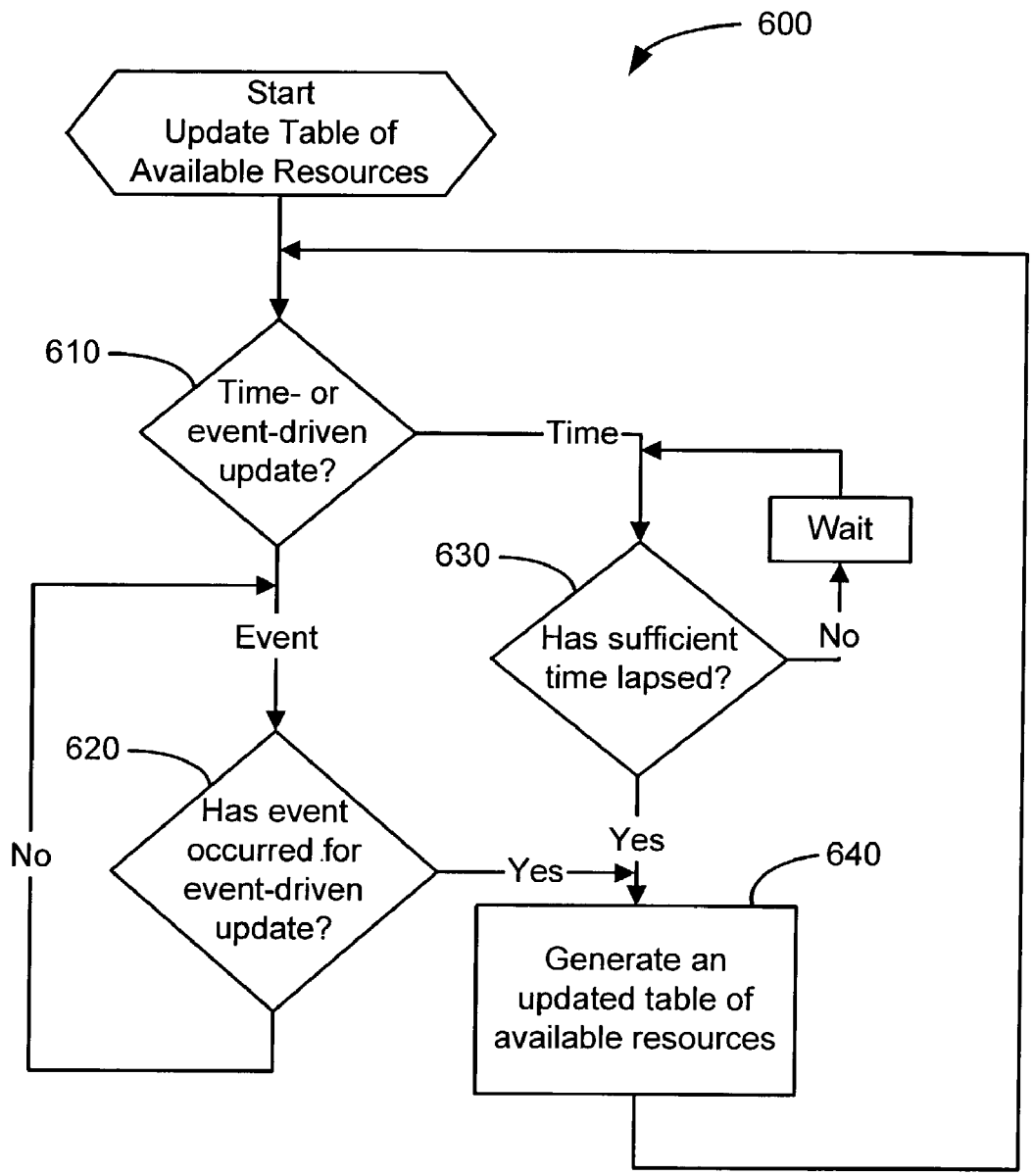
FIG. 6 is a logic flow diagram illustrating an overview of a process for updating a table of available resources as exemplified in FIG. 5 according to one exemplary embodiment of the present invention.

Referring now to FIG. 6, this figure illustrates an overview of an exemplary process 600, referred to as Update Table of Available Resources, of the present invention for tracking resources that have potential utility for processing action items. In a preferred and exemplary embodiment, this process can be embodied in code that is a component of the Automatic Action Item Processing Module 175. The process provides for updating 640 the Table of Available Resources 500 that is exemplified in FIG. 5.

The table 500 can be updated either on an event- or a time-driven basis 610. Non-limiting examples of event triggers are 1) system restart, 2) loading new software, 3) connecting or disconnection a network connection, 4) user prompt, 5) prompt from an external computer, 6) entering a new action item. Using a time-driven update, the table 500 can be updated daily, hourly, monthly, or over any time period 630 that is user-specified, system-defined or otherwise determined.

Although not specifically outlined in the Figure, the update process 600 can provide for individual portions of the table 500 to be updated based on unique time and event parameters. For example, external resources 520 might be updated only when a network connection is established or disrupted, whereas the availability of a high-resolution printer 532 might be updated on an hour-by-hour basis. Such a network connection can include a hard-wire connection, a fiber optic connection, or a wireless connection. Routine 640 can include a sub-process for seeking resources over a network such as a LAN or the Internet. A schedule of availability can also be maintained so that the timing of handling an action item can be coordinated with the availability of resources.

Dynamic tracking of resource availability facilitates a downgrade in an action item's designation when warranted by changing conditions. For example, suppose a restaurant with web service for catering orders was routinely used for automatically processing action items related to ordering lunches. If the restaurant goes out of business and no backup restaurant is available, a downgrade from automatic to manual would be appropriate in most circumstances. If the restaurant is temporarily closed or too busy to take an order, the downgrade may only be temporary. Dynamic resource tracking provides up-to-date status of resource availability so that action items can be appropriately handled.

In one aspect of the present invention, dynamic resource tracking facilitates handling a list of action items by distributing the processing requirements for the list among a network of computers. For example, based on the availability of resources, each action item from the list can be handled by the network computer with the best resources for processing that action item. Alternatively, the processing steps required to complete a single action item from the list can be distributed among multiple networked computers; each network computer can process the steps for which its resources are best suited.

The logical flow of the routine Update Table of Available Resources 600 will now be described. Decision step 610 determines if a time-driven update or an event-driven update is appropriate. In a preferred and exemplary embodiment, the decision can be based on user input, not illustrated. If a time-driven update is determined, the process 600 flow is directed to a timer routine 630 that determines if sufficient time has lapsed to generate an updated table of available resources. In a preferred and exemplary embodiment, the timer is set by user input, not illustrated. When the timer routine 630 determines that sufficient time has lapsed, update routine 'generate an updated table of available resources' 640 is engaged. In a preferred and exemplary embodiment, this update routine 640 includes specific instructions, not illustrated, to append the table 500 that is illustrated in FIG. 5 and/or to set or reset exemplary resource flags 501, 502. Such resource flags 501, 502 can be related to resource parameters such as current or predicted availability. After the update routine 640 is complete, flow returns to the top of the routine 600. Consequently, a user can switch from a time-driven update to an event-driven update.

If an event-driven update is determined by decision step 610 rather than a time-driven update, process flow is directed to a routine 620 that determines if the event has occurred. If a determination is made that the event has occurred, flow is directed to the update routine 640 described above. If the event has not occurred, the determination routine 620 is iterated until a positive determination is encountered. At that point, the table 500 is updated.

Exemplary Components and Processes for Mapping Resources to Action Items

Figure 7:
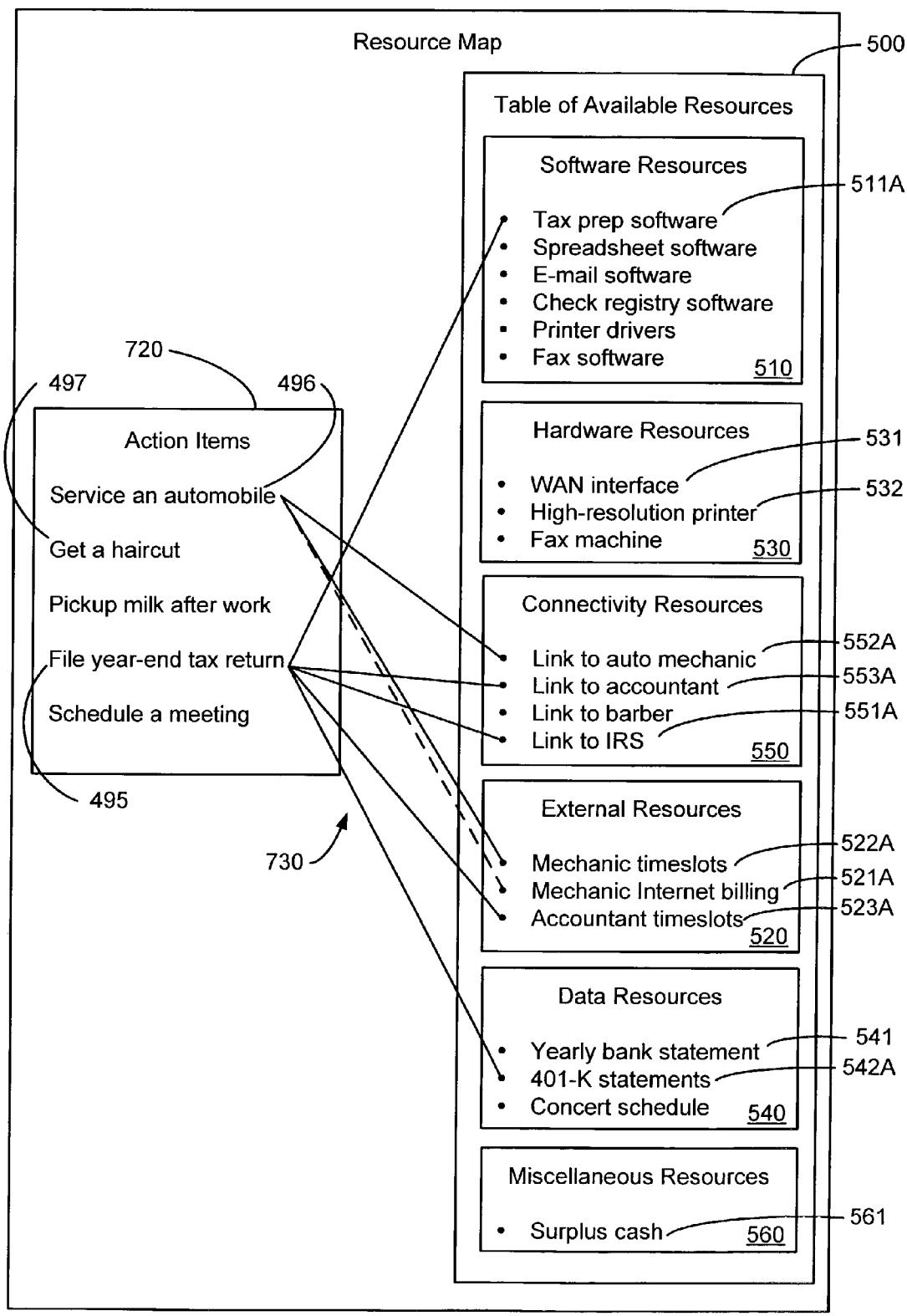
FIG. 7 illustrates an overview of an exemplary map between the resource requirements of an exemplary action item and exemplary available resources having potential utility for processing action items according to one exemplary embodiment of the present invention.

Referring now to FIG. 7, this figure illustrates an overview of an exemplary resource map 700 for one embodiment of the present invention. The Resource Map 700 illustrates two action items 496, 495 mapped 730 to resources 500 so that the resource requirements or needs of specific action items are specified. In a preferred and exemplary embodiment of the present invention, this mapping can be carried out in the Automatic Action Item Processing Module 175. Based on the availability of mapped resources, an action item can be processed automatically, semi-automatically or manually. And, if adequate resources are not available, processing the action item might be precluded. The availability flag 501, 502 that is illustrated in FIG. 5, but not in FIG. 7, can indicate current availability.

The action item 'service an automobile' 496 is mapped to connectivity resource 'link to auto mechanic' 552A and external resources 'mechanic timeslots' 522A and 'mechanic Internet billing' capabilities 521A. The action item 'file year-end tax return' 495 is mapped to: 1) software resource 'tax prep software' 511A; 2) connectivity resources 'link to accountant' 553A and 'link to IRS' 551A; 3) external resource 'accountant timeslot' 523A; and 4) data resource '401-K statement' 542A.

Figure 8A:
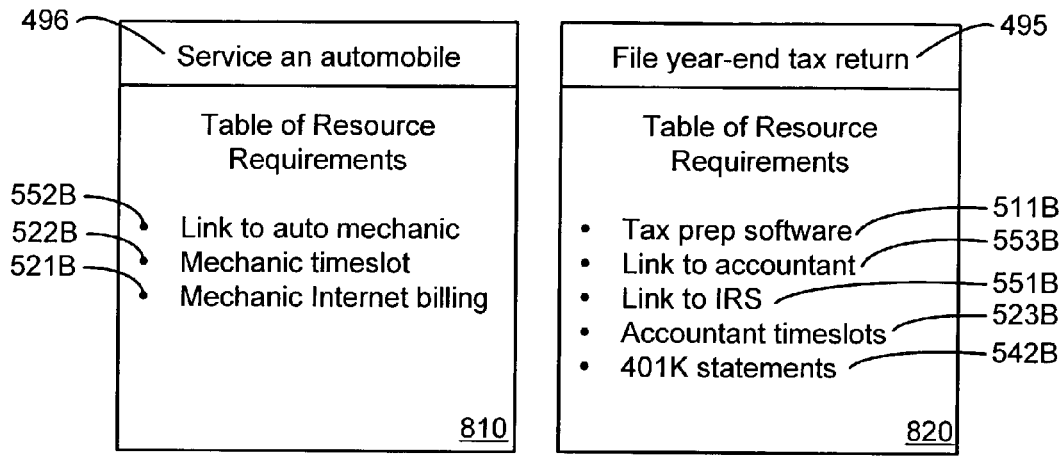
FIGS. 8A-8B is a table and a logic flow diagram illustrating an overview of an exemplary component and an exemplary process for specifying an action item's resource requirements according to one exemplary embodiment of the present invention.
Figure 8B:
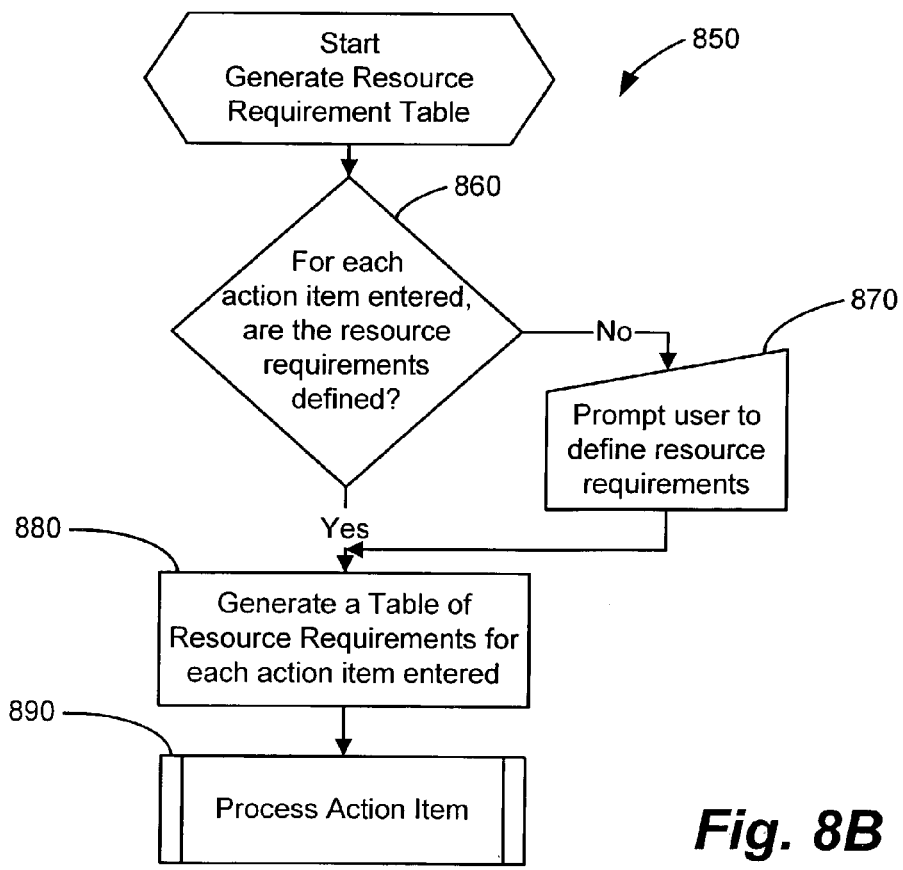

Referring now to FIGS. 8A-8B, FIG. 8A illustrates an overview of two exemplary tables 810, 820 for specifying an action item's resource requirements. FIG. 8B illustrates an exemplary process 850 for generating the tables. Tables for specifying an action item's resource requirements are useful to generate the mapping 730 illustrated in FIG. 7.

Referring now to FIG. 8A, this figure illustrates an exemplary Table of Resource Requirements 810 for the action item 'service an automobile' 496. The first exemplary table 810 includes three resource requirement entries: 1) 'link to auto mechanic' 552B; 2) 'mechanic timeslot' 522B; and 3) 'mechanic Internet billing' 521B. The second exemplary table 820 includes five resource requirement entries: 1) 'tax prep software' 511B 2) 'link to accountant' 553B; 3) 'link to IRS' 551B; 4) 'accountant timeslots' 523B; and 5) '401K statements' 542B. These tables 810, 820 facilitate the generation of the two exemplary maps 730 that are illustrated in FIG. 7 and described above.

A brief summary follows. A Table of Resource Requirements 810, 820, as depicted in FIG. 8A, outlines the resource needs for processing an action item 495, 496. A Table of Available Resources 500, as depicted in FIG. 5, outlines resources having potential utility for processing action items. A Resource Map, as depicted in FIG. 7, maps 730 an action item's resource requirements into available resources. The mapped resources can be flagged 501, 502, as illustrated in FIG. 5 to indicate current resource availability. Based on the map 730 and the availability of the resources indicated by the map 730, the action item can be designated as automatic, manual, or semiautomatic and processed accordingly. The assessment and handling process is described below in reference to FIGS. 9-12.

Referring now to FIG. 8B, this figure illustrates an overview of an exemplary process 850 for generating resource requirement tables. The illustrated process 850 provides for a user to define resource requirements for circumstances in which the requirements are not otherwise defined. In a preferred and exemplary embodiment of the present invention, elements and processes representative of those depicted in FIGS. 8A-8B can be included in the Automatic Action Item Processing Module 175.

Following the start sequence for the exemplary process Generate Resource Requirement Table 850, an inquiry 860 is made to determine if the resource requirements are already defined for each action item entered, or selected, by a user. If the inquiry results in a negative determination, the user is prompted in routine 860 to define resource requirements for the action items that need definition. Although not illustrated in this process 850, the definition can come from a variety of sources other than the user; for example it can come by way of regular software updates that can be provided by a software supplier.

After the resource requirements are defined 870 for all the relevant action items, table-generation routine 880 generates a Table of Resource Requirements, as illustrated in the example tables 810, 820 that are described above and depicted in FIG. 8A, for each entered action item. If inquiry 860 results in a positive, rather than a negative determination, the next step subsequent to the inquiry 860 is the table-generation routine 880.

The next step following the generation of tables is to engage the Process Action Items routine 890. As described below, that routine 890 includes steps for assessing action items and for initiating processing steps in accordance with the assessment.

Those skilled in the computer arts will recognize that the present invention includes a wide range of possible embodiments and processes for specifying an action item's resource needs and for outlining available resources and for correlating needed resources to available resources.

Exemplary Processes for Assessing and Processing an Action Item

Figure 9:
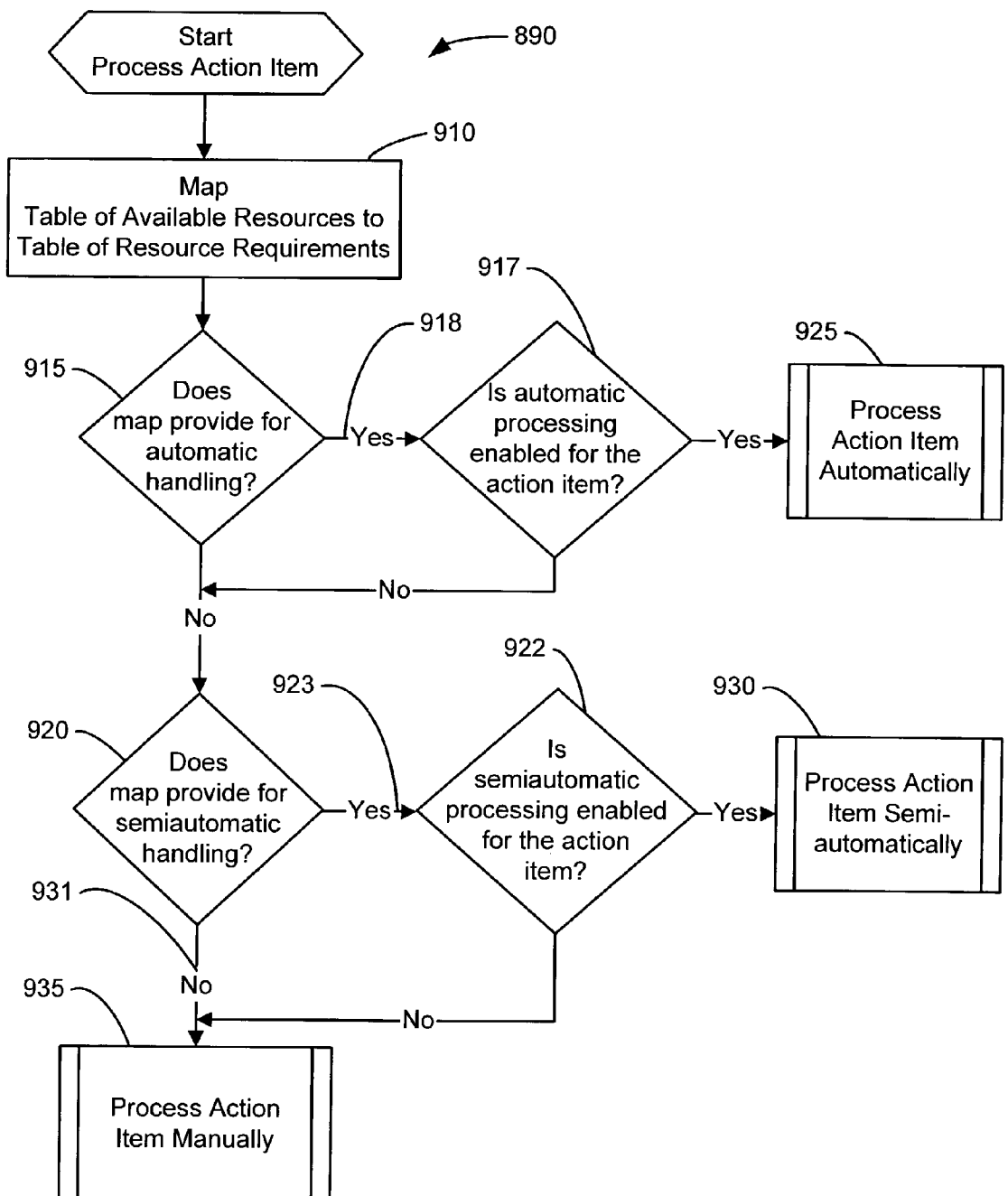
FIG. 9 is a logic flow diagram illustrating an overview of an exemplary process for assessing the extent of human intervention and automatic processing associated with an action item and for initiating the processing of the action item in a manner commensurate with the assessment according to one exemplary embodiment of the present invention.

Referring now to FIG. 9, this figure illustrates a logic-flow-diagram overview of an exemplary process 890, labeled Process Action Item routine, for assessing an action item and for processing it in a manner commensurate with the assessment. The process 890 can be repeated for each action item in a set of entered action item. The assessing includes determining the extent to which an action item can be processed with manual or human intervention steps and automatic or computer-based steps. In a preferred and exemplary embodiment of the present invention, the logic flow diagram can be represented in code that is included in the Automatic Action Item Processing Module 175.

The process 890 will now be described following the path of logic flow. In step 910 the aforementioned mapping 730 between the Table of Available Resources 500 and the Table of Resource Requirements 800 is generated. Following the mapping step 910, an assessment is made in inquiry 915 to determine if the map 730 provides for automatic handling. If the inquiry results in a positive determination, a signal 918 is generated to initiate the automatic processing of the action item. However, before the positive-inquiry signal 918 can initiate automatic processing by engaging the routine Process Action Item Automatically 925, an inquiry is made 917 to determine if automatic processing is enabled for the action item that is being processed. If the inquiry 917 determines that automatic processing is enabled, the positive-inquiry signal 918 is interrupted and the action item is processed automatically.

If either automatic processing is not enabled as determined by inquiry routine 917 or inquiry routine 915 determines that the map 730 does not provide for automatic handling, process flow is transferred to inquiry routine 920. Inquiry routine 920 determines if the map 730 provides for semiautomatic handling of the action item. If the inquiry is positive, a signal 923 is generated to initiate the semiautomatic processing of the action item. However, before the positive-inquire signal 923 can initiate semiautomatic processing by engaging the routine Process Action Item Semi-automatically 930, an inquiry is made 922 to determine if semiautomatic processing is enabled for the action item that is being processed. If the inquiry 922 determines that semiautomatic processing is enabled, the positive-inquiry signal 923 is interrupted and the action item is not processed semi-automatically.

If either semi-automatic processing is not enabled as determined by inquiry routine 922 or inquiry routine 920 determines that the map 730 does not provide for semiautomatic handling, a signal 931 is generated to initiate the manual processing of the action item. This signal engages the routine Process Action Item Manually 935. The routine 890 is typically engaged for each action item in a list of action items.

Various aspects of the Process Action Item routine will now be described. Based on mapping 730, an action item is assessed 915, 920 as to the extent of human intervention and automatic processing associated with its implementation. The exemplary process provides for classifying or associating a designation with an action item. The designation can be based on discrete levels such as automatic 915, semiautomatic 920, or manual 920. The designation can correspond to a threshold of human intervention and a threshold of automatic processing. Alternatively, an action item can be assessed in terms of a graduated level, not shown. The assessment can be exacting or it can be a prediction.

In the discrete classification approach that is illustrated in FIG. 9, automatic refers to an action item that can be completed with essentially fully automatic processing or computer-based steps. In other words, an automatic action item can be processed to completion using a level of manual processing that is essentially zero and a level of automatic processing that is greater than zero.

Semiautomatic refers to an action item that can be completed with a combination of automatic processing or computer-based steps and manual processing or human-intervention steps. In other words, a semiautomatic action item can be processed to completion using a level of automatic processing that is greater than zero and a level of manual processing that is also greater than zero.

Manual refers to an action item that can be completed with manual processing or human-intervention steps. In other words, a manual action item can be processed to completion using a level of automatic processing or computer-based steps that is essentially zero and a level of manual processing or human intervention steps that is greater than zero.

In summary, based on the circumstances and resources, the present invention can provide an assessment to determine if an action item should be handled automatically using computer-based processing, manually using human-intervention processing, or semi-automatically using a combination of human intervention and manual processing. Responsive to or commensurate with this determination, a signal 918, 923, 931 that can include a prompt is generated to initiate processing of the action item in accordance with the determination.

Logic process steps 917 and 922 provide for user input to specify the extent of computer-based, or automatic processing, that is employed for processing an action item. A user can signal manual or semiautomatic processing of an action item for which automatic processing is available; this aspect allows a user to override a designation.

The process 890 provides for generating a signal 918, 923, 931 to process 925, 930, and 935 an action item automatically 925, semi-automatically 930, or manually 935 commensurate with the assessment. The process 890 can also include processing the action item to completion. The processing steps can be completed in a single computer or in a plurality of networked computers.

Those skilled in the computer arts will recognize that the present invention includes a wide range of possible embodiments and processes for assessing an action item, for predicting the optimal combination of manual and automatic processing, and for outlining the resources available to process the action item. In one embodiment of the present invention, an action item can be referenced to a look-up table. In other aspect of the present invention, a user can assess an action item. In yet another aspect, an action item can be preliminarily processed with automatic steps and then designated as semiautomatic or manual based on processing progress or user intervention. For example, if processing is stalled or becomes delayed, the designation can be downgraded from automatic to semiautomatic or manual.

Assessment Examples

The present invention can assess action items in an unconstrained, dynamic operating environment. Consequently, the result of an action item's assessment is dependent on various parameters of the operating environment such as the availability of resources and the preference of a user. To provide a contextual overview of action item assessment, several action items are briefly described below. The description is neither exhaustive nor precise; it is illustrative. It should be understood that the present invention provides for numerous assessment variations and can accommodate a wide range of action items beyond those described below.

Manual Action Items

A manual designation can refer to an action item that can be primarily handled with human intervention processing. A manual designation can refer to action items such as 'get my teeth cleaned at the dentist,' not illustrated, 'get a haircut' 497, and 'service an automobile' 496 as illustrated in FIGS. 4B, 7, and 8A. In these examples, the steps to complete the action item primarily include human activities entailing manual steps. A computer can remind the human, by a prompt or another signaling provision, to initiate steps associated with completing the steps. For example, a prompt or other signal can remind a user to pick up milk on the way home from work on Monday, to stop by the barber during Thursday's lunch, or drop off an automobile at the service center on Friday morning. In one aspect of the present invention, a reminder can be delivered via a computer that is not otherwise involved in processing the action item. For example, a stationary personal computer 250A can establish wireless communication to a personal organizer computer system 270, as illustrated in FIG. 2A, that is carried on one's person. The stationary computer can send a reminder to the organizer for subsequent delivery to the person.

Semiautomatic Action Items

A semiautomatic designation can refer to an action item that can be handled with a combination of human intervention and automatic processing. A semiautomatic designation can refer to action items such as 'file year-end tax return' 495 and 'service an automobile' 496 as illustrated in FIGS. 4B, 7, and 8A. In these examples, both a computer and a human can take steps to complete the action item. In the example of 'service an automobile' 496, a semiautomatic designation can be appropriate rather than a manual designation if sufficient resources are available to process one or more steps of the action item using automatic processing rather than manual intervention.

A computer's automatic processing can include steps such as utilizing a WAN network connectivity link to the auto mechanic 552, as listed in FIG. 5, to coordinate the user's schedule of time availability with that of the service center's automobile mechanic 522. A human's manual intervention can include manual steps such as dropping the automobile off at the service center and filling out service center billing paperwork. In the example of 'file year-end tax return' 495, illustrated in FIG. 4, automatic processing might include steps implemented through tax prep software 511, illustrated in FIG. 5, such as compiling and assembling information to generate appropriate tax forms. Manual actions can include meeting with an accountant and physically mailing the tax return.

Automatic Action Items

An automatic designation can refer to an action item that is handled primarily with one or more computer systems, such as a personal computer or another machine capable of automatic processing. An automatic designation can refer to action items such as 'schedule a meeting' or 'service an automobile' 496, illustrated in FIG. 4. In these examples, a computer can take essentially all steps to complete the action item. In the example of 'service an automobile' 496, an automatic designation can be appropriate rather than a manual or a semiautomatic designation if sufficient resources are available to process essentially all steps associated with completing the action item using automatic processing. Exemplary computer-based automatic steps can include: 1) tracking the auto's mileage to determine need for oil change; 2) establishing a computer-to-computer connection with a service center; 3) scheduling for the service center to pick up the automobile, complete the oil change, and return the automobile; and 4) transacting the sale. Referring now to FIG. 5, resources to facilitate these automatic steps can include a connectivity link to the auto mechanic 552, a mechanic Internet billing system 521, and mechanic timeslots 522. Thus, an automatic verses semiautomatic designation can be based on the availability of external resources 520 related to a mechanic service center's resources to pickup and return an automobile and to complete transaction paperwork by computer 521.

Exemplary Process for Automatically Processing an Action Item

Figure 10:
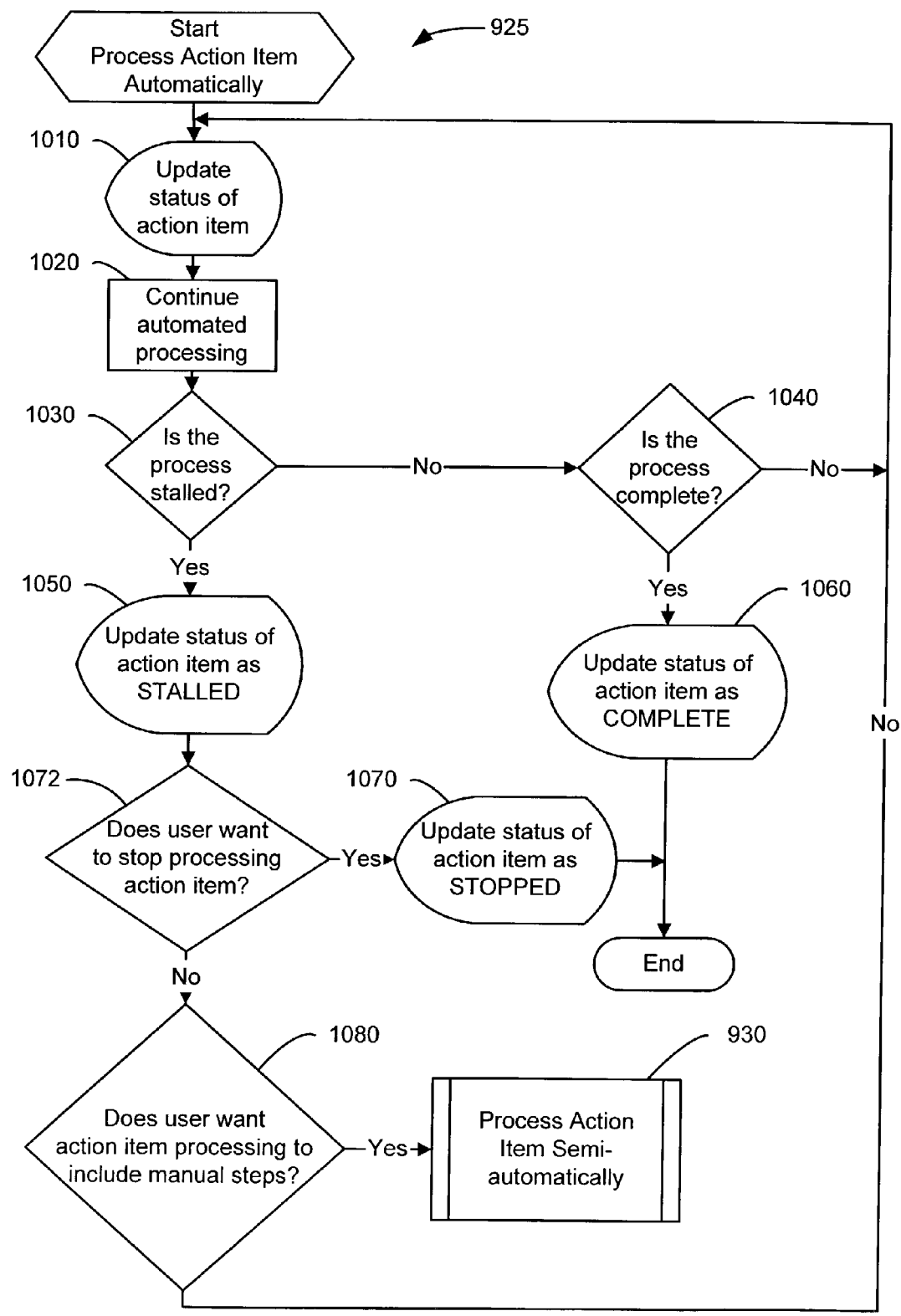
FIG. 10 is a logic flow diagram illustrating a sub-method of FIG. 9 for automatically processing an action item according to one exemplary embodiment of the present invention.

Referring briefly back to FIG. 9, the routine Process Action Item can initiate the automatic processing of an action item, for example engaging the exemplary routine Process Action Item Automatically 925. Referring now to FIG. 10, the figure illustrates a logic flow diagram that is an overview of the exemplary process for automatically processing action items. In a preferred and exemplary embodiment of the present invention, code representative of the logic flow diagram can be included in the Automatic Action Item Processing Module 175. Automatic processing of an action item can also be implemented in a computer that is networked to another computer that implements other aspects of the present invention such as mapping 910 and assessing 915, 920 steps and generating signals 918, 920, 931 to initiate action item processing.

The process 925 provides for a user to signal to stop the automatic processing 1072 before an action item is completed. Once automatic processing is stopped, the user can signal 1080 the action item to be processed manually by restarting the Process Action Item routine 890 that is described above and illustrated in FIG. 9. The process 925 also includes a stalling routine 1050 that can include a timer, not illustrated, for testing for excess time lag between automatic steps. The process 925 also include provisions 1080 for the user to engage semiautomatic processing 930 if completion progress is stalled. The process 925 also has provisions 1030, 1040, 1050 for tracking progress in completing an action item and provisions 1010, 1050, 1060, 1070 for updating the status of the action item so that a user can monitor completion progress 225 from the screen display 200 depicted in FIG. 2B.

The logic of the routine Process Action Item Automatically 925 will now be described according to the flow sequence. After initialization, the routine includes a step 1010 to update the status of the action item. As indicated in FIG. 2B, this status can be displayed 230 in the appropriate section 225 of a user interface screen display 200. After the status is updated, control is transferred to routine 1020 whereby one or more automatic processing steps are implemented. Subsequently, an inquiry 1030 is made to determine if the automatic processing is stalled. If automatic processing is not stalled, an inquiry 1040 is made to determine if the process is complete. If the process is not complete, routines 1010 and 1020 are iterated. If the process is complete, the status of the action item is updated as COMPLETE by routine 1060. Routine 1060 can also provide an indication that the action item was completed with automatic processing. Following routine 1060, the automatic processing routine 925 ends.

If inquiry 1030 determines that the process is stalled, the status of the action item is updated as STALLED. Next, an inquiry 1072 is made to determine if the user wants to stop processing the action item. If the inquiry 1072 is positive, the status of the action item is updated as STOPPED by routine 1070 and the automatic processing routine 925 ends. If inquiry 1072 determines that a user does not want to stop processing the action item, an inquiry 1080 is made to determine if the user wants to include manual steps in the processing of the action item. If the inquiry determines that the user wants to include manual steps, the routine Process Action Items Semi-automatically 930 is engaged. If the inquiry determines that the user does not want to include manual steps in processing the action item, the post initialization steps of the automatic processing routine 925 are iterated.

Exemplary Process for Semi-Automatically Processing an Action Item

Figure 11:
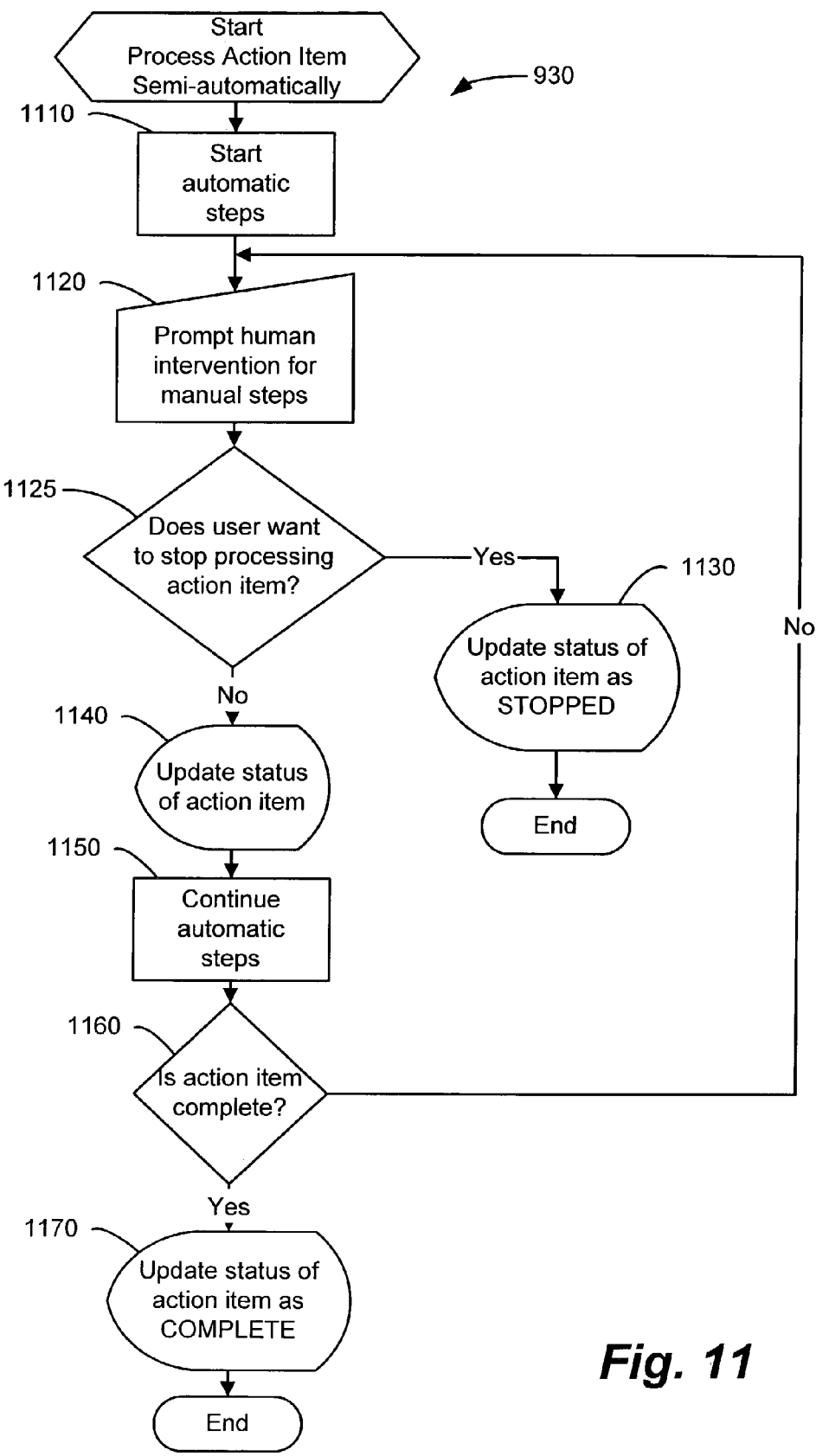
FIG. 11 is a logic flow diagram illustrating a sub-method of FIG. 9 for semi-automatically processing an action item according to one exemplary embodiment of the present invention.

Referring briefly back to FIG. 9, the routine Process Action Item can also initiate the semiautomatic processing of an action item, for example engaging the exemplary routine Process Action Item Semi-automatically 930. Referring now to FIG. 11, the figure illustrates a logic flow diagram that is an overview of the exemplary process for semi-automatically processing action items.

In a preferred and exemplary embodiment of the present invention, code representative of routine 930 can be included in the Automatic Action Item Processing Module 175. The logic flow diagram can also be implemented in a networked computer that is linked to a computer that implements other aspects of the present invention.

The exemplary process 930 parses action item processing into manual and computer steps by iterating 1160 between generating a signal to initiate automatic processing steps 1150 and prompting human intervention 1120 for manual steps. The process 930 also provides for a user to initiate a signal to stop processing of the action item before the action item has been completed. This provision offers a user the option to stop semi-automatically processing the action item and take up manual processing. The process 930 updates the status of the action item 1130, 1140, 1170 so that a user can monitor the status 225 of processing progress from the screen display 200 depicted in FIG. 2B.

The logic of the routine Process Action Item Semi-automatically 930 will now be described according to the flow sequence. After initialization, routine 1110 implements any initial automatic processing steps needed to complete the action item. Next, routine 1120 generates a prompt to signal a human to intervene and implement manual steps in accordance with the action item's processing requirements. Next, an inquiry 1125 is made to determine if a user wants to stop processing the action item. If the determination is positive, update routine 1130 updates the status as STOPPED and the semi-automatic processing routine 930 ends. If the determination is negative, the status is updated by update routine 1140, for example defining the status as MANUAL STEP NEEDED. Following status update 1140, the automatic processing routine 1150 implements automatic processing steps in accordance with the action item's processing requirements. Next, inquiry routine 1160 makes a determination if the action item has been completed. If the action item is complete, update routine 1170 updates the status as COMPLETE. Routine 1170 can also provide an indication that the action item was completed with semiautomatic processing. Following routine 1170, the semiautomatic processing routine 930 ends. If the action item is not complete the semiautomatic process 930 is iterated beginning with the step 1120 for prompting for manual intervention. The iteration provides for implementing manual and automatic steps via routines 1120 and 1150 in a sequence that meets the action item's processing requirements.

Exemplary Process for Manually Processing an Action Item

Figure 12:
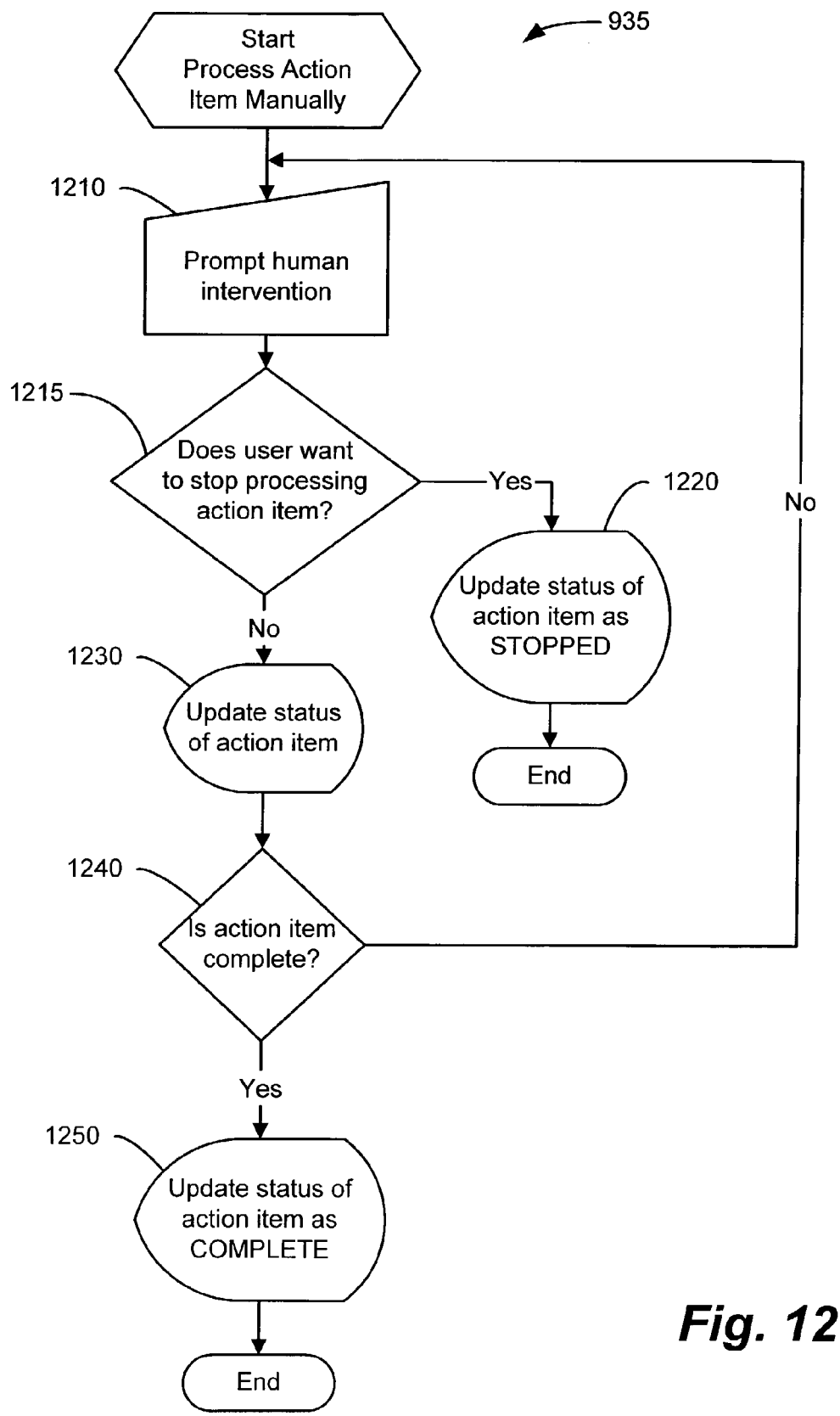
FIG. 12 is a logic flow diagram illustrating a sub-method of FIG. 9 for manually processing an action item according to one exemplary embodiment of the present invention.

Referring briefly back to FIG. 9, the routine Process Action Item can initiate the manual processing of an action item, for example engaging the exemplary routine Process Action Item Manually 935. Referring now to FIG. 12, the figure illustrates a logic flow diagram that is an overview of the exemplary process for manually processing action items.

In a preferred and exemplary embodiment of the present invention, code representing the logic flow diagram can be included in the Automatic Action Item Processing Module 175. The logic flow diagram can also be implemented in a network computer that is linked to another computer that implements other aspects of the present invention.

The process 935 includes iterating a step 1210 that includes generating a signal to prompt a human to intervene and complete manual processing steps. Iteration continues until a determination is made that the action item is complete 1240. The process 935 also provides for a user to signal to stop manually processing of the action item before processing is complete. After stopping manual processing, a user can generate a signal to initiate automatic or semiautomatic processing by restarting the Process Action Item Routine illustrated in FIG. 10 and described above. The process 935 updates the status of the action item 1220, 1250 so that a user can monitor the status of processing progress 225 from the screen display 200 depicted in FIG. 2B.

The logic of the routine Process Action Item Manually 935 will now be described according to the flow sequence. After initialization, routine 1210 generates a signal to prompt a human to intervene and complete one or more manual steps. Next, an inquiry routine 1215 determines if a user want to stop processing the action item. If the inquiry is positive, status routine 1220 updates the status of the action item as STOPPED and the manual processing routine 935 ends. If the inquiry is negative, update routine 1230 updates the status of the action, for example defining the status as MANUAL STEP NEEDED. After the status is updated, inquiry routine 1240 determines if the action item is complete. If it is complete, update routine 1250 defines the status as COMPLETE. Routine 1250 can also provide an indication that the action item was completed with manual processing. Following routine 1250, the manual processing routine 935 is ended. If it is not complete, the manual processing routine 935 is iterated beginning with prompting step 1210.

CONCLUSION

Accordingly, the present invention can provide a method and system for intelligently handling action items in a manner commensurate with application requirements, action item parameters, dynamic resource conditions, and user preferences. The present invention can assess action items based on parameters of the operating environment and determine the extent to which action items can be completed automatically with computer-based processing steps, manually with human-intervention steps, or semi-automatically with both automatic and manual steps. The present invention can generate a signal to process action items in a manner commensurate with the assessment. Responsive to the signal, the present invention can engage internal, local, remote, or networked resources to process the action item. The present invention can also provide a user interface specially configured for intelligently handled action items and includes electronic-ink and natural language processing capabilities.

It should be understood that the foregoing relates only to illustrative embodiments of the present invention, and that numerous changes may be made therein without departing from the spirit and scope of the invention as defined by the following claims.

What is claimed is:

1. A method for computer-based handling of action items comprising:
   providing a table of available resources with entries, each entry identifying a resource and indicating whether that resource is available;
   entering a set of action items into a computer system by, for each action item of the set,
   providing steps for the action items;
   providing a table of resource requirements with entries, each entry identifying a resource needed for processing the steps of the action item; and
   for each step of an action item, determining by a computer whether a resource for that step is not available as indicated by the provided table and when a resource is determined to be not available, indicating that the step is to involve human intervention, and when all the resources for the step are available, indicating that the step is to involve automatic processing; and processing the action items by
- if human intervention is indicated for a step of an action item based on availability of a resource, then displaying by the computer an indicator to prompt human intervention; and
- if automatic processing is indicated for a step of an action item based on availability of a resource, then initiating automatic processing by the computer commensurate with the determination.

2. The method of claim 1, further comprising assigning a designation to the action item, wherein the designation is associated with a threshold of human intervention and a threshold of automatic processing.

3. The method of claim 2, wherein the assigning step comprises assigning an automatic designation to the action item, and the method further comprising the step of receiving a command to change the automatic designation to a manual designation.

4. The method of claim 2, wherein the designation corresponds to one of automatic, semiautomatic, and manual, and wherein:
- an automatic action item is associated with a threshold of human intervention that is essentially zero and a threshold of automatic processing that is greater than zero;
- a semiautomatic action item is associated with a threshold of human intervention that is greater than zero and a threshold of automatic processing that is greater than zero; and
- a manual action item is associated with a threshold of human intervention that is greater than zero and a threshold of automatic processing that is essentially zero.

5. The method of claim 1, further comprising:
- displaying an indicator to process an action item with fully automatic processing based upon the determining step;
- displaying an indicator to process the action item with a combination of automatic processing and human intervention based upon the determining step; and
- displaying an indicator to process the action item with complete human intervention based upon the determining step.

6. The method of claim 1, further comprising updating a table listing resources available to complete one of more of the tasks.

7. The method of claim 1, wherein displaying an indicator further comprises displaying an icon on a computer screen.

8. The method of claim 1, further comprising displaying a status as to progress of an action item.

9. The method of claim 1, wherein the entering step comprises processing electronic ink with a tablet personal computer.

10. The method of claim 1, wherein the initiating automatic processing step comprises transmitting information over a wireless link between a computer system and a computer network.

11. The method of claim 1, wherein the entering step comprises receiving freeform text and natural language processing of the freeform text.

12. The method of claim 1, further comprising:
- completing at least one action item of the set; and
- displaying an indication that the at least one action item is complete and was processed with one of manual processing, semiautomatic processing, and automatic processing.

13. A method for computer-based handling of action items comprising:
- providing a table of available resources with entries, each entry identifying a resource and indicating whether that resource is available;
- for each of a plurality of action items,
  - providing steps for the action items;
  - providing a table of resource requirements with entries, each entry identifying a resource needed for processing the steps of the action item; and
  - determining an extent of human intervention and automatic processing associated with processing the steps of the action item such that the action item is designated as automatic, semi-automatic, or manual;
- when an action item is designated as automatic, automatically processing the steps of the action item by a computer using resources identified by the table of resource requirements for the action item that are available as indicated by the table of available resources and semi-automatically processing steps of the action item when either a resource identified by the table of resource requirements for the action item is not available as indicated by the table of available resources or the automatic processing of the steps becomes delayed;
- when an action item is designated as semi-automatic, automatically processing automatic steps of the action item using resources identified by the table of resource requirements for the action item that are available as indicated by the table of available resources and manually processing steps of the action item that are designated as manual by prompting for user intervention; and
- when an action item is designated as manual, manually processing steps of the action item by prompting for user intervention.

14. The method of claim 13 wherein the providing of the table of resource requirements includes:
- prompting a user to define resource requirements for an action item;
- receiving from the user an indication of resource requirements for the action item; and
- adding an entry to the table of resource requirements for the action item for each indicated resource requirement.

15. The method of claim 13 wherein the automatically processing includes when the processing of a step of the action item is stalled, determining whether a user wants the action item to include manual steps and when it is determined that the user wants the action item to include manual steps, continuing with semi-automatically processing of the steps of the action item.

16. The method of claim 13 including updating entries in the table of available resources to indicate current availability of resources.

17. The method of claim 16 wherein updating of entries is event and time driven.

18. The method of claim 16 wherein updating of entries is time driven.

19. The method of claim 16 wherein updating of entries is event driven.

20. A computer-readable storage medium containing computer-executable instructions for execution by a computer to control the computer to handle action items, by a method comprising:
- providing a table of available resources with entries, each entry identifying a resource and indicating whether that resource is available;
- for each of a plurality of action items,
  - providing steps for the action items;

providing a table of resource requirements with entries, each entry identifying a resource needed for processing the steps of the action item; and designating the action item as automatic or not automatic;

when an action item is designated as automatic, automatically processing the steps of the action item by a computer system using resources identified by the table of resource requirements for the action item that are available as indicated by the table of available resources and semi-automatically processing steps of the action item when a resource identified by the table of resource requirements for the action item is not available as indicated by the table of available resources; and when an action item is designated as not automatic, automatically processing any automatic steps of the action item using resources identified by the table of resource requirements for the action item that are available as indicated by the table of available resources and manually processing steps of the action item that are designated as manual by prompting for user intervention.

\* \* \* \* \*

UNITED STATES PATENT AND TRADEMARK OFFICE
CERTIFICATE OF CORRECTION

PATENT NO. : 7,571,108 B1 Page 1 of 1
APPLICATION NO. : 10/458552
DATED : August 4, 2009
INVENTOR(S) : Roy Leban It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1638 days.

Signed and Sealed this

Seventh Day of September, 2010

David J. Kappos
*Director of the United States Patent and Trademark Office*